United States Patent [19]
Orchier et al.

[11] Patent Number: 6,070,244
[45] Date of Patent: May 30, 2000

[54] COMPUTER NETWORK SECURITY MANAGEMENT SYSTEM

[75] Inventors: Jonathan Orchier; Raymond Soriano; Louis Salvaterra; Dario Ardito; Anil Byreddy, all of Brooklyn, N.Y.

[73] Assignee: The Chase Manhattan Bank, New York, N.Y.

[21] Appl. No.: 08/966,902

[22] Filed: Nov. 10, 1997

[51] Int. Cl.[7] .................................................. G06F 15/16
[52] U.S. Cl. ........................ 713/201; 713/200; 713/201; 709/223; 709/224; 709/225
[58] Field of Search .................... 713/200, 201; 709/220, 223, 224, 225, 250, 227, 229; 395/500.44, 500.47, 500.48

[56] References Cited

U.S. PATENT DOCUMENTS

| | | | |
|---|---|---|---|
| 5,442,791 | 8/1995 | Wrabetz | 709/104 |
| 5,566,346 | 10/1996 | Andert | 710/8 |
| 5,623,667 | 4/1997 | Golshani | 395/705 |
| 5,655,081 | 8/1997 | Bonnell | 709/202 |
| 5,675,782 | 10/1997 | Montague | 713/201 |
| 5,761,669 | 6/1998 | Montague | 707/103 |
| 5,872,970 | 2/1999 | Pickett | 709/101 |
| 5,881,232 | 3/1999 | Cheng | 709/217 |
| 5,966,707 | 10/1999 | Van Huben | 707/10 |

OTHER PUBLICATIONS

Network Briefing "Memco Software tries again with its automated Single Sign–On" May, 28, 1997 n285 Dialog Abstract.

www.bmc.com. Accessed Sep. 30, 1999.

"Internet: Memco Software tries again with its automated Signle Sign–On" Network Briefing, n285, May 28, 1997.

*Primary Examiner*—Robert W. Beausoliel, Jr.
*Assistant Examiner*—Bryce P. Bonzo
*Attorney, Agent, or Firm*—Ostrolenk, Faber, Gerb & Soffen, LLP

[57] ABSTRACT

A method and system for controlling computer security. The system is a centralized, computer-network security management tool capable of handling many different kinds of equipment in a standardized format despite differences in the computer security features among the diverse range of computer equipment in the computer network. The invention uses a layered software architecture, including a technology specific layer and a technology independent layer. The technology specific layer serves to extract and maintain security data on target platforms and for converting data to and from a common data model used by the technology independent layer. The technology independent layer handles the main functionality of the system such as locating and removing certain present and former employees from computer access lists, auditing system user data, monitoring security events (e.g. failed login attempts), automatically initiating corrective action, interfacing with the system users, reporting, querying and storing of collected data.

34 Claims, 36 Drawing Sheets

FIG. 5a

| Run Date: | | Server Threshold & Parameter Exceptions | |
|---|---|---|---|
| Parameter Name | Value | Expected | Value |

Netware

| Parameter | Value | Expected Value |
|---|---|---|
| Number of unsuccessful login attempts | 4 | 3 |
| Number of allowed concurrent logins | 2 | 1 |
| Number of different passwords before reuse of old passw | 0 | 8 |
| Minimum password size | 0 | 6 |
| Maximum days password can be used before force to chang | 0 | 90 |
| Number of different passwords before reuse of old passw | 0 | 8 |
| Number of unsuccessful login attempts | 7 | 3 |

Sybase

| Parameter | Value | Expected Value |
|---|---|---|
| Maximum days password can be used before force to chang | 0 | 90 |
| Maximum days password can be used before force to chang | 0 | 90 |
| Maximum days password can be used before force to chang | 0 | 90 |
| Maximum days password can be used before force to chang | 0 | 90 |

Unix

| Parameter | Value | Expected Value |
|---|---|---|
| Maximum days password can be used before force to chang | 168 | 90 |
| Maximum days password can be used before force to chang | 168 | 90 |
| Maximum days password can be used before force to chang | 168 | 90 |
| Maximum days password can be used before force to chang | 168 | 90 |
| Maximum days password can be used before force to chang | 168 | 90 |

*FIG. 7a*

Account activity after Termination (Used in the past month)
List of User Accounts of Terminated Employees (LINE-OF-BUSINESS wise)
TGS RISK MANAGEMENT

| Server | Name | User Id | Priv | Last Login | Created on | TermDate | Location | Floor | Action |
|---|---|---|---|---|---|---|---|---|---|
| PLATFORM: | Netware | | | | | | | | |
| GARRY | | | | | Expense Code: 21902 | | | | |
| | caroline BROWN | C BROWN | N | 1/21/97 | 8/19/96 | 1/17/97 | 1 CMP | 50 | |
| GLOBAL ASSET SERVICES | | | | | Expense Code: 20113 | | | | |
| | Brian BROWN | B BROWN | N | 2/3/97 | 6/19/96 | 1/17/97 | 3 CMC | 5 | |
| GLOBAL SERVICES DELIVERY | | | | | Expense Code: 04570 | | | | |
| | Nadine BROWN | N BROWN | N | 1/23/97 | 10/21/94 | 1/17/97 | 3 CMC | 6 | |
| | Angela BROWN | A BROWN | N | 2/3/97 | 8/19/94 | 1/17/97 | 3 CMC | 7 | |

*FIG. 7b*

| User Id | Min Sz | Alpha | Password Life | Hist | Reuse | PreExp | Lgn Disb | Con Conn | Stn Disb | Banner |
|---|---|---|---|---|---|---|---|---|---|---|
| Netware | | | | | | | | | | |
| Server Name | | | | | | | | | | |
| Server Defaults: | 6 | | 90 | 8 | | | 3 | 1 | | |
| | 5 | | 90 | 8 | | | | 1 | | |
| | 5 | | 90 | 8 | | | | 1 | | |
| | 5 | | 90 | 8 | | | | 1 | | |
| | 6 | | 40 | 0 | | | | 0 | | |
| | 6 | | 90 | 8 | | | | 3 | | |
| | 6 | | 40 | 0 | | | | 0 | | |
| | 6 | | 90 | 8 | | | | 2 | | |
| | 6 | | 90 | 8 | | | | 4 | | |
| | 6 | | 90 | 8 | | | | 1 | | |
| | 5 | | 90 | 8 | | | | 1 | | |
| | 6 | | 90 | 8 | | | | 3 | | |
| | 5 | | 40 | 0 | | | | 0 | | |
| | 0 | | 0 | 0 | | | | 0 | | |
| | 6 | | 90 | 8 | | | | 3 | | |
| | 5 | | 90 | 8 | | | | 1 | | |
| | 6 | | 0 | 8 | | | | 3 | | |
| | 6 | | 0 | 0 | | | | 2 | | |
| | 5 | | 0 | 8 | | | | 1 | | |
| | 6 | | 90 | 0 | | | | 2 | | |
| | 6 | | 0 | 8 | | | | 2 | | |
| | 6 | | 90 | 8 | | | | 2 | | |
| | 6 | | 90 | 8 | | | | 2 | | |
| | 6 | | 90 | 8 | | | | 2 | | |
| | 6 | | 90 | 8 | | | | 3 | | |
| | 6 | | 90 | 8 | | | | 2 | | |
| | 6 | | 90 | 8 | | | | 3 | | |
| | 6 | | 90 | 8 | | | | 3 | | |
| | 6 | | 90 | 8 | | | | 2 | | |
| | 0 | | 0 | 0 | | | | 0 | | |
| | 6 | | 90 | 8 | | | | 2 | | |
| | 6 | | 40 | 8 | | | | 2 | | |
| | 6 | | 90 | 8 | | | | 2 | | |
| | 6 | | 90 | 8 | | | | 2 | | |
| | 6 | | 90 | 8 | | | | 3 | | |
| | 6 | | 90 | 8 | | | | 2 | | |
| | 0 | | 0 | 0 | | | | 0 | | |
| | 6 | | 90 | 8 | | | | 2 | | |
| | 6 | | 90 | 0 | | | | 0 | | |
| | 6 | | 90 | 0 | | | | 0 | | |

*FIG. 7c*

| SERVER TYPE CD | SERVER NAME | USER ID | EVENT DATE | RESULT | EVENT DESCRIPTION |
|---|---|---|---|---|---|
| NT | | | APR 7 1997 1:01:47:000PM | S | ESTABLISH USER/ASSIGN CARD |
| NT | | | APR 7 1997 1:14:58:000PM | S | ESTABLISH USER/ASSIGN CARD |
| NT | | | APR 7 1997 1:15:06:000PM | S | ESTABLISH USER/ASSIGN CARD |
| NT | | | APR 7 1997 1:15:16:000PM | S | ESTABLISH USER/ASSIGN CARD |
| NT | | | APR 7 1997 1:36:17:000PM | S | ESTABLISH USER/ASSIGN CARD |
| NT | | | APR 7 1997 1:56:54:000PM | S | ESTABLISH USER/ASSIGN CARD |
| NT | | | APR 7 1997 9:22:11:000PM | S | ESTABLISH USER/ASSIGN CARD |
| NT | | | APR 7 1997 9:23:17:000PM | S | ESTABLISH USER/ASSIGN CARD |
| NT | | | APR 8 1997 10:26:00:000AM | S | ESTABLISH USER/ASSIGN CARD |
| NT | | | APR 8 1997 5:49:56:000PM | S | ESTABLISH USER/ASSIGN CARD |
| NT | | | APR 8 1997 1:40:07:000PM | F | POSSIBLE INTRUDER EVENT |
| NT | | | APR 8 1997 3:43:48:000PM | F | POSSIBLE INTRUDER EVENT |
| NT | | | APR 8 1997 3:43:50:000PM | F | POSSIBLE INTRUDER EVENT |

DDTS RISK MANAGEMENT SECURITY ADMINISTRATION

FILE EDIT FUNCTION PLATFORM FUNCTIONS WINDOW HELP

TABLE UPDATE - COLLECTION DATE

| CURRENT PERIOD | ENVIRONMENT | DATA TYPE | COLLECTION DATE | FREQUENCY |
|---|---|---|---|---|
| $ | MW | S | 7/1/96 | M |
| 1 | NT | S | 5/13/96 | M |
| 1 | MW | S | 5/9/96 | M |
| 1 | RF | S | 6/11/96 | M |
| 1 | SY | S | 6/11/96 | M |
| 1 | UN | T | 8/1/96 | B |
| 8 | ED | T | 5/16/96 | B |
| 7 | ED | T | 5/2/96 | B |
| 6 | ED | T | 4/12/96 | B |
| 5 | ED | T | 4/1/96 | M |
| 4 | ED | T | 3/14/96 | B |
| 3 | ED | U | 2/29/96 | M |
| 2 | ED | U | 8/15/96 | B |
| 22 | MW | U | 8/15/96 | B |
| 22 | RF | U | 8/1/96 | B |
| 21 | MW | U | 7/15/97 | B |
| 20 | MW | U | 7/15/97 | B |
| 20 | RF | U | 7/1/97 | B |
| 19 | MW | U | 6/15/97 | B |
| 18 | MW | U | 6/15/97 | B |
| 18 | RF | U | 6/1/97 | B |
| 17 | MW | U | 5/15/97 | B |
| 16 | MW | U | 5/15/97 | B |
| 16 | RF | U | 5/1/97 | B |
| 15 | MW | U | 5/1/97 | B |
| 15 | RF | U | 4/15/97 | B |
| 14 | MW | U | 4/15/97 | B |
| 14 | RF | U | 4/15/97 | B |

[ ADD ]  [ DELETE ]  [ CLOSE ]

| ENVIRONMENT | ACTIVE | DEADLINE DATE | APPLICATION | GROUP | MODIFICATION DATE | CONTACT 1 | CONTACT 2 | CONTACT 1 |
|---|---|---|---|---|---|---|---|---|
| NW | N | 96 10:00:25AM | APPTEST3 | TEST 3 | /30/96 10:01:34AM | | | |
| NW | N | | ADP | SRV ADP | 8/30/96 9:58:49AM | | | |
| NW | NT | | APPTEST1 | TEST 1 | /28/96 10:20:02AM | | | |
| NW | N | 96 10:18:27AM | APPTEST2 | TEST 2 | 8/29/96 4:34:53PM | | | |
| NW | | | ART PROGRAM | SRV ART | | | | |
| NW | | | BPS BUDGET PLANNER | SRV BPS | | | | |
| NW | | | CARMS (NAS) | SRV CARMS HAS | | | | |
| NW | | | CARMS (SLA) | SRV CARMS SLR | | | | |
| NW | N | | CORPORATE CARMS | SRV CORPCARM | 9/6/96 2:07:35PM | | | |
| NW | | | CREDIT POLICY GUIDE | SRV CPGUIDE | | | | |
| NW | | | DCU (DOCUMENT CO | SRV DCU | | | | |
| NW | | | DEALFLOW | SRV DEALFLOW | | | | |
| NW | | | DEALFLOW DISPLAY | SRV DEALDISP | | | | |
| NW | | | DEALSCAN | SRV DEALSCAN | | | | |
| NW | | | DESK TOP DBA | DBADESK | | | | |
| NW | | | DIALOG INFORMATION | SRV DIALOG | | | | |
| NW | | | DIALOUT SERVICE | SRV DOMJONES | | | | |
| NW | | | DIALOUT SERVICE | SRV DUNES | | | | |
| NW | | | DIALOUT SERVICE | SRV INVESTXT | | | | |
| NW | | | DIALOUT SERVICE | SRV SECDATA | | | | |
| NW | | | FUNDING RELATIONSHIP | FRDB | | | | |
| NW | | | HLPC | HLPC | | | | |
| NW | | | HLT RIGHTLY LEANING | SRV HU | | | | |
| NW | | | INTENTIONAL EQUIRES | SRV LOTUS | | | | |
| NW | | | LOAN BUYER | SRV LOANBUY | | | | |
| NW | | | LOAN PRICING MODEL | SRV LPMODEL | | | | |
| NW | | | LOAN ONE SOURCE | SRV NETWORKS | | | | |

SAVE  SWITCH  ADD  UPDATE  CLOSE

FIG. 8g

DDTS RISK MANAGEMENT SECURITY ADMINISTRATION
FILE EDIT FUNCTION PLATFORM FUNCTIONS WINDOW HELP

TABLE UPDATE - HIGH RISK REPORT

| ENVIRONMENT | APPLICATION | GROUP | CURRENT PERIOD | TOTAL ACCTS. | TOTAL PREV. ACCTS. | REPORT TYPE | ACCOUNTS TO BE PURGED |
|---|---|---|---|---|---|---|---|
| NW | ADP | SRV ADP | 1 | 397 | 0 | T | 0 |
| NW | ART PROGRAM | SRV ART | 1 | 15 | 0 | T | 1 |
| NW | BPS BUDGET PLANNER | SRV BPS | 1 | 670 | 0 | T | 235 |
| NW | CARMS (NAS) | SRV CARMS NAS | 1 | 20 | 0 | T | 0 |
| NW | CARMS (SLA) | SRV CARMS SLR | 1 | 26 | 0 | T | 0 |
| NW | CORPORATE CARMS | SRV CORPCARM | 1 | 455 | 0 | T | 0 |
| NW | CREDIT POLICY GUIDE | SRV CPGUIDE | 1 | 613 | 0 | T | 0 |
| NW | DCU (DOCUMENT CO | SRV DCU | 1 | 312 | 0 | T | 0 |
| NW | DEALOW | SRV DEALFLOW | 1 | 117 | 0 | T | 45 |
| NW | DEALOW DISPLAY | SRV DEALDSP | 1 | 54 | 0 | T | 41 |
| NW | DEALSCAN | SRV DEALSCAN | 1 | 345 | 0 | T | 0 |
| NW | DESK TOP DBA | DBADESK | 1 | 4 | 0 | T | 0 |
| NW | DIALOG INFORMATION | SRV DIALOG | 1 | 48 | 0 | T | 0 |
| NW | DIALOUT SERVICE | SRV DOWJONES | 1 | 399 | 0 | T | 9 |
| NW | DIALOUT SERVICE | SRV DUNES | 1 | 346 | 0 | T | 9 |
| NW | DIALOUT SERVICE | SRV INVESTXT | 1 | 3 | 0 | T | 5 |
| NW | DIALOUT SERVICE | SRV SECDATA | 1 | 372 | 0 | T | 5 |
| NW | FUNDING RELATIONSHIP | FRDB | 1 | 8 | 0 | T | 0 |
| NW | HLPC | HLPC | 1 | 350 | 0 | T | 0 |
| NW | HLT RIGHTLY LEAVING | SRV HLJ | 1 | 3 | 0 | T | 0 |
| NW | INTENTIONAL EQUIRES | SRV LOTUS | 1 | 999 | 0 | T | 7 |
| NW | LOAN BUYER | SRV LOANBUY | 1 | 42 | 0 | T | 0 |
| NW | LOAN PRICING MODEL | SRV LPN MODEL | 1 | 176 | 0 | T | 0 |
| NW | LOAN ONE SOURCE | SRV NETWORK | 1 | 1198 | 0 | T | 0 |
| NW | NAMES/NEXIS | SRV NEXIS | 1 | 141 | 0 | T | 0 |
| NW | OXFORD ADVANCED | SRV OXFORD | 1 | 35 | 0 | T | 0 |
| NW | PARS (PROBLEM AREA) | SRV PARS | 1 | 542 | 0 | T | 542 |
| NW | PORTIA | PORTIA | 1 | 20 | 0 | T | 2 |

UPDATE    CLOSE

FIG. 8h

DDTS RISK MANAGEMENT SECURITY ADMINISTRATION

FILE EDIT FUNCTION PLATFORM FUNCTIONS WINDOW HELP

TABLE UPDATE - EVENT CODE

| ENVIRONMENT | ENVIRONMENT CODE | PANDORA CODE | DESCRIPTION |
|---|---|---|---|
| PW | 0 | 401 | ICMP REDIRECT |
| PW | 0 | 402 | POSSIBLE NAME SPOT |
| PW | 0 | 403 | UNSERVE PORT |
| NT | 1 | 300 | READ2 q |
| NT | 2 | 300 | EXECUTE |
| NT | 3 | 300 | WRITE |
| NT | 4 | 300 | DELETE |
| NT | 5 | 300 | TAKE A OWNERSHIP |
| NT | 8 | 300 | CHANGE PERMISSION |
| NT | 9 | 300 | TEST |
| NT | 101 | 102 | TEST 101 |
| NT | 201 | 300 | TEST123 |
| NT | 301 | 300 | TEST IT AGAIN |
| NT | 516 | 201 | SOME AUDIT EVENT |
| NT | 517 | 202 | AUDIT LOG CLEANED |
| NT | 531 | 101 | ACCOUNT CURRENTLY |
| NT | 534 | 101 | LOG ON TYPE RESTRICTION |
| NT | 539 | 101 | UNSUCCESSFUL LOGON |
| NT | 608 | 103 | USER RIGHT ASSIGNED |
| NT | 609 | 103 | USER RIGHT REMOVED |
| NT | 612 | 203 | AUDIT POLICY CHANGE |
| NT | 612 | 204 | AUDIT POLICY CHANGE |
| NT | 624 | 100 | USER ACCOUNT CREATE |
| NT | 630 | 104 | IUSER ACCOUNT DELETE |
| NT | 1010 | 300 | TEST |
| NW | 0 | 101 | OS INTRUDES CHG |
| NW | 0 | 106 | OS DISABLE USER |
| NW | 0 | 107 | OS ENABLE USER |

ADD  UPDATE  CLOSE

ADD ACCOUNT

ID

NAME

DEPT

SSN

```
8            # of input fields
15           # of output fields
―            field delimiter
0  1  "NW"   for this line and the next 14 lines...
1  2  " "       column 1 is the field position
2  3  " "          in the input. "0" means
3  4  " "          there is no input fields
4  5  " "       column 2 is the field position
5  0  " "          in the output.
0  6  " "  add_year (5)  column 3 is used to place constant
7  7  " "                   data is an output field
8  8  " "                column 4 is the name of a routine
6  9  " "                   that gets executed to fill
0  10 "0"                   in the output field.
0  11 "0"
0  12 " " get_first3 (3)    these routines cause the name field to be
0  13 " " get_sec2or3 (3)   broken up into up to 3 parts to facilitate
0  14 " " get_first1 (3)    searching, and also extract the social
0  15 " " get_ssn (3)       security number into a separate output field.
```

FIG. 11b

```perl

Glean desired data from Somar NT audit file

$ARGV (0) =~ s?\\?/?g;   #change backslash in file name to forward slash
$ARGV (1) =~ s?\\?/?g;   #change backslash in file name to forward slash
open ( SECLOG, "$ARGV [0]" )    || die "ERROR - Could not open SECLOG $ARGV(0)\n";
open ( OUTFILE, ">$ARGV [1]" )  || die "ERROR - Could not open OUTFILE $ARGV(1)\n";

readloop: while (<SECLOG>) {
        $_ =~ s/\|/ /g;
        @recflds    = split (';', $_, 9 );
#       $logtype    = $recflds [0];
        $datatime   = $recflds [1];
        $source     = $recflds [2];
        $eventcd    = $recflds [3];
        $successcd  = substr ($recflds[4],0,1);
#       $successcd  = $recflds [4];
#       $category   = $recflds [5];
        $recflds [6] =~ m/(\\) (.+)/;
        $user       = $2;
        $computer   = $recflds[7];
        $recdata    = $recflds[8];

some audit event recs discarded
if ( $eventcd == 516 ) {
        $pandoracd = 201;
        print OUTFILE "NT|$computer|$user|$pandoracd|$eventcd|$datetime|
$successcd|0|||\n";
```

FIG. 11c

```
next;      ### audit log cleared
           if ( $eventcd = = 517 ){
               $recdata = ~ m/(Client User Name:) (\t) (.+)/;
               $x = index ($3, `^^`);
               $user = substr ($3, 0, $x);
               $pandoracd = 202;
               print OUTFILE "NT| $computer | $user | $pandoracd | $eventcd | $datetime |
$successcd | 0 | | | \n";
               next;
           } account currently disabled
           if ( $eventcd = = 531 ) {
               $recdata = ~ m/(User Name:) (\s+) (.+)/;
               $x = index ($3, `^^`);
               $user = subtr ($3, 0, $x);
               $recdata = ~ m/(Domain:) (\s+) (.+)/;
               $x = index ($3, `^^`);
               $miscdata = $1 .  `.` .  substr ($3, 0, $x) . ` ; `;
               $recdata = ~ m/(Workstation Name:) (\s+) (.+)/;
               $x = index ($3, `^^`);
               $miscdata .= $1 . `.` . substr ($3, 0, $x) . ` ; `;
               $pandoracd = 101;
               print OUTFILE  "NT| $computer | $user | $pandoracd | $eventcd | $datetime|
$successcd | 0 | | $miscdata ";
               print OUTFILE "Logon attempted to disable account | | \n";
               next;
           } logon type restricted
           if ( $eventcd = = 534 ) {
               $recdata = ~ m/(User Name:) (\s+) (.+)/;
               $x = index ($3, `^^`);
               $user = sub r ( $3, 0, $x);
```

COMPUTER NETWORK SECURITY MANAGEMENT SYSTEM

BACKGROUND OF THE INVENTION

The present invention is generally directed to a computer security system and, more particularly, to a centralized, computer-network security management system capable of handling many different kinds of equipment in a standardized format despite differences in the computer security features among the diverse range of computer equipment in the computer network.

With the current-day increase in dependence on information systems for doing business the risk of misuse or sabotage of those systems has grown to be very real. Making the problem more real are the daily news stories of hackers breaking into computers, and computers being infected with viruses. Adding to the risk is the rise in the number of mergers and acquisitions, which has resulted in large numbers of both new system users and potentially disgruntled displaced workers.

To reduce the risk, various technical solutions have been developed, for example the requirement for a password to be entered before logging on to a system. In addition, non-technical solutions have been developed, for example in the form of company policies that mandate the disablement of logon accounts not used for 90 days or more.

These solutions have helped alleviate the problems but have also opened up new ones. The technical solutions have brought with them the need for security administration, and with that has sometimes come incomplete or incompetent administration. There is a need for constant auditing of security systems to ensure compliance. The large number of users and systems makes manual auditing impractical. Larger companies tend to have the additional problem arising from their use of large computer networks containing many different kinds of equipment, each with its own version of security handling features and protocols. These incompatible protocols and the added problem of rapidly changing technical environments on world wide networks have aggravated and impeded the search for a satisfactory solution.

At present, many large companies are saddled with large, complicated information security schemes that contain loopholes and which cannot be supervised and audited effectively. This has increased their vulnerability to unauthorized use of their confidential information systems and databases for industrial espionage or even to sabotage.

SUMMARY OF THE INVENTION

Accordingly, it is an object of the present invention to provide an improved security management system for computer networks.

It is a further object of the invention to provide a computer network security management system which is easier to implement and use.

Yet another object of the invention is to provide a computer network security management system which provides a high measure of confidence that the security of a computer network will not be breached.

A further object of the invention is to provide a computer network security management system having a standardized protocol for handling security issues across a large range of different pieces of computer equipment.

The foregoing and other objects of the invention are realized in accordance with the present invention by a system which collects information from all repositories of security data on a computer network, standardizes it, stores the data in a central database and enables automatic and manual correction of erroneous data.

Components of the invention report on exceptions to, i.e. deviations from, security policies, and an automatic mechanism dynamically fixes compliance problems by administering the native security platforms. An analysis component reviews incoming data, looking for system break-in attempts and irregular or suspicious changes to vital security components. Another analysis component enables grouping of data by person or organization, across security platform boundaries. A manual maintenance component allows system maintenance to be done through a common user interface.

The invention uses a layered software architecture, enabling a separation of basic functions from the complications of differing technologies, and facilitating automated handling of many operations. The architecture can be viewed at a very high level as consisting of two layers: technology specific and technology independent. The technology specific layer consists of many groups of software modules, each group addressing the complexities of a single technology (e.g., NetWare™ 3.1, Windows NT, AIX, Sybase, etc.). The primary functions of the technology specific layer are extracting and maintaining security data on the target platforms, and converting the data to and from the common data model used by the technology independent layer.

The technology independent layer handles the main functionality of the system: locating terminating employees, auditing system and user data, monitoring security events (e.g. failed login attempts), automatically initiating corrective action, interfacing with the system users, reporting, querying and storing of collected data.

The invention is unique in many aspects including the following. It is a self-correcting data security audit system. In contrast, many existing approaches rely on manual correction after policy discrepancies are detected. The invention automatically takes action, changing system parameters (e.g., minimum password length made consistent with policy) or user parameters (e.g., forcing a password change at the next login if time limit is exceeded) as necessary.

The invention is also able to capture security data from all of the different platforms, consolidate it and operate on it in a common format. It is also unique in that it is able to identify the persons who own the various accounts. Existing products collect data only for a single environment or machine, leaving the security officers to manually consolidate across platforms.

Analyzing multi-platform data for security break-in attempts is another unique aspect. Sophisticated attacks on the information systems can be detected with this feature. The invention also provides the ability to manage security with a single user interface while not giving up the ability to simultaneously use platform specific tools. Prior to the invention, a decision to use centralized security management forced abandonment of platform specific tools. This is because centralized management tools use their own accounts data base which is then replicated to the actual platforms. Changes not made through the centralized tool are "lost" as far as the centralized tool is concerned. The invention avoids this limitation by routinely collecting data from the platforms, so it is always aware of changes.

Other features and advantages of the present invention will become apparent from the following description of the invention which refers to the accompanying drawings.

BRIEF DESCRIPTION OF THE DRAWINGS

FIG. 3b is a continuation of FIG. 3a.

FIGS. 5a–5d are sample computer screens generated in the course of the collection agent component of the present invention performing its tasks.

FIGS. 7a–7c are sample security reports produced by the present invention.

FIGS. 8a–8h show further computer operator screens generated in the course of the operation of the present invention.

FIG. 10 shows an information entry block form used to add an account in the system of the present invention.

FIGS. 11a–11c show portions of computer source code used to implement certain functions performed by the present invention.

DETAILED DESCRIPTION OF THE INVENTION

Figure 1:
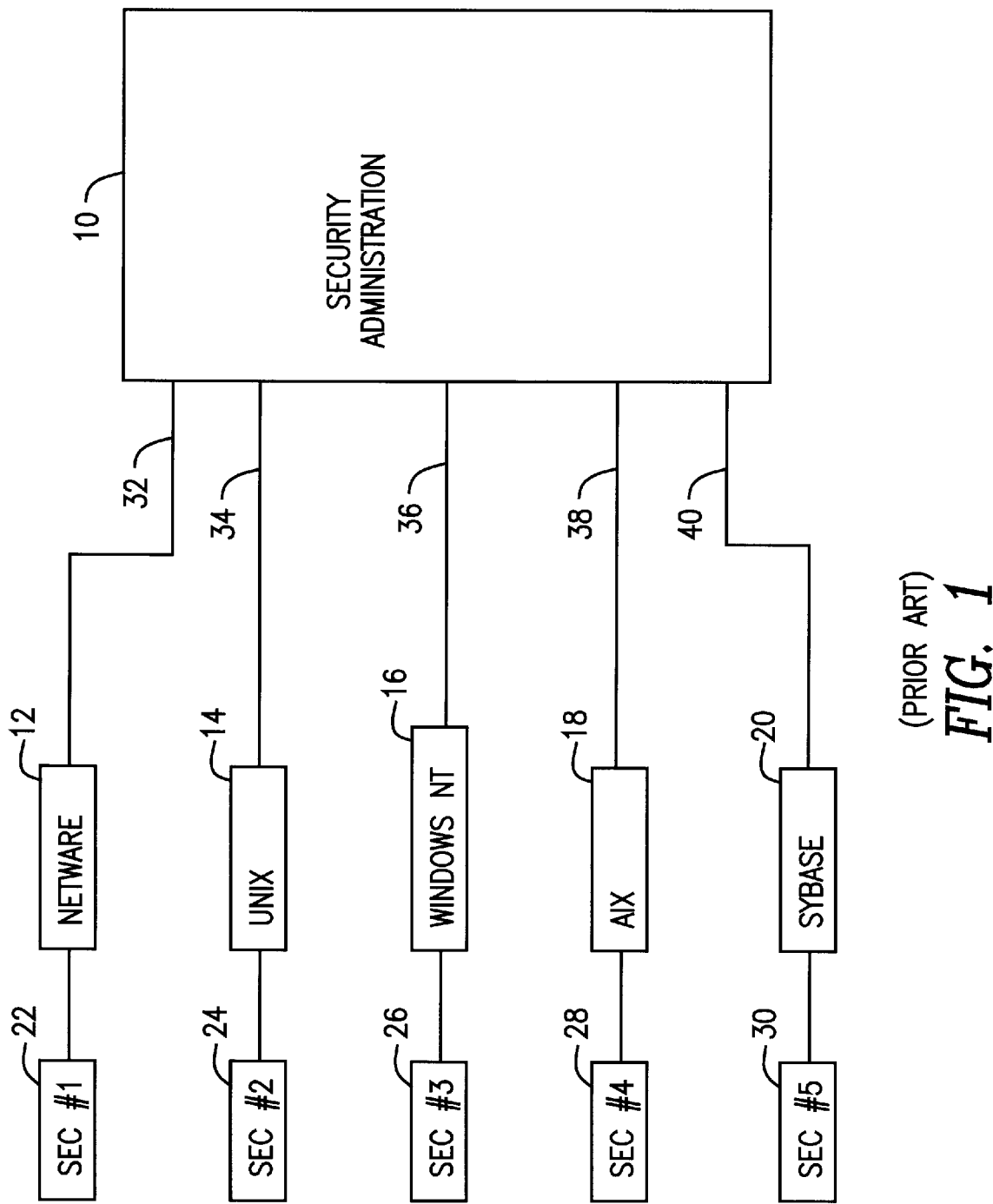
FIG. 1 is a block diagram of a prior art computer security management system.

With reference to FIG. 1, typical large business or governmental organizations have complex computer systems comprising many different computer hardware units or networks that operate under diverse and disparate software products which are intrinsically incompatible with one another. In a typical system, one group of computers may operate under a Netware software system 12, another group 14 may use the Unix operating system 14, a third Windows NT 16, or AIX 18 or constitute a database operating under the Sybase 20 database software system. Each of these systems has a different and unique security management approach and protocol, as represented by the security system software blocks 22, 24, 26, 28, 30 which correspond to the software systems 12, 14, 16, 18, 20, respectively.

To the extent that a system administrator wishes to exercise supervision and control over security issues relating to such systems, it is necessary for the various groups of computers to be connected to a central security administration system 10 via specifically designated lines 32, 34, 36, 38 and 40. In the prior art, the security administration system 10 may comprise no more than individual computer terminal(s) (not shown) which allow security personnel to individually query and maintain security standards at the different computer systems on a system-by-system basis. The approach of the prior art is cumbersome and not particularly reliable.

Figure 2:
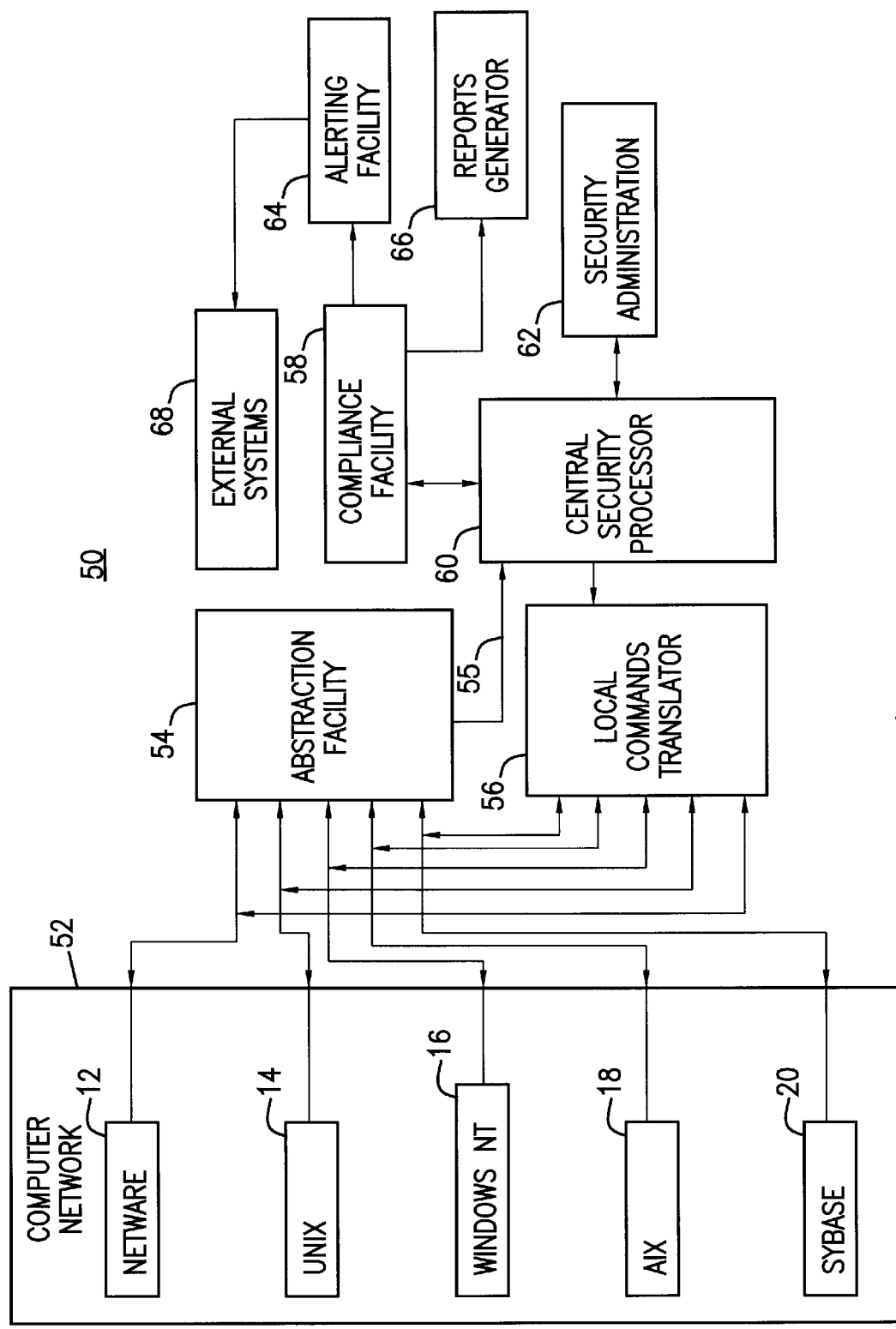
FIG. 2 is a conceptual block diagram of the system layout of a centralized computer network security management system in accordance with the present invention.

The present invention allows a security administration system 50 (conceptually shown in FIG. 2) to handle security issues on a global basis by enabling personnel which are responsible for it or automatic computer equipment to issue common commands that are applicable to the various pieces of hardware and software subsystems. With reference to FIG. 2, a company-wide computer network 52 consists of different hardware/software subsystems, 12, 14, 16, 18 and 20 each of which has a specific security domain 22–30 (FIG. 1) are all coupled to an abstraction facility 54 which serves to reformat and standardize security related data packets. Thereby, the abstraction facility 54 is able to provide over line 55 security data pertaining to all of the subsystems 12–20 for the purpose of being handled by the central security processor 60 in a consistent and standard manner. This enables the security administration or personnel 62 which is coupled to the central security processor 60 to handle and deal with security issues in a direct, globally applicable and standardized format. Indeed, the central processor 60 is programmed to act on many security related decisions automatically. Either way, when a decision concerning security matters is made, the processor responds by taking several actions, including providing relevant information and commands to a compliance facility 58 which process the information and causes the central security processor 60 to issue the appropriate commands to the local commands translator 56.

The function of the local commands translator 56 is to convert common security-related instructions to group-wise or device-specific instructions which can be understood by the individual subsystems 12–20 of the computer network 52. The compliance facility 58 also interfaces with an alerting facility agent 64 that is able to contact key personnel or other computer systems, e.g. an external system 68, regarding security breaches. Appropriate hard copy reports and the like can be provided through a reports generator 66.

Figure 3A:
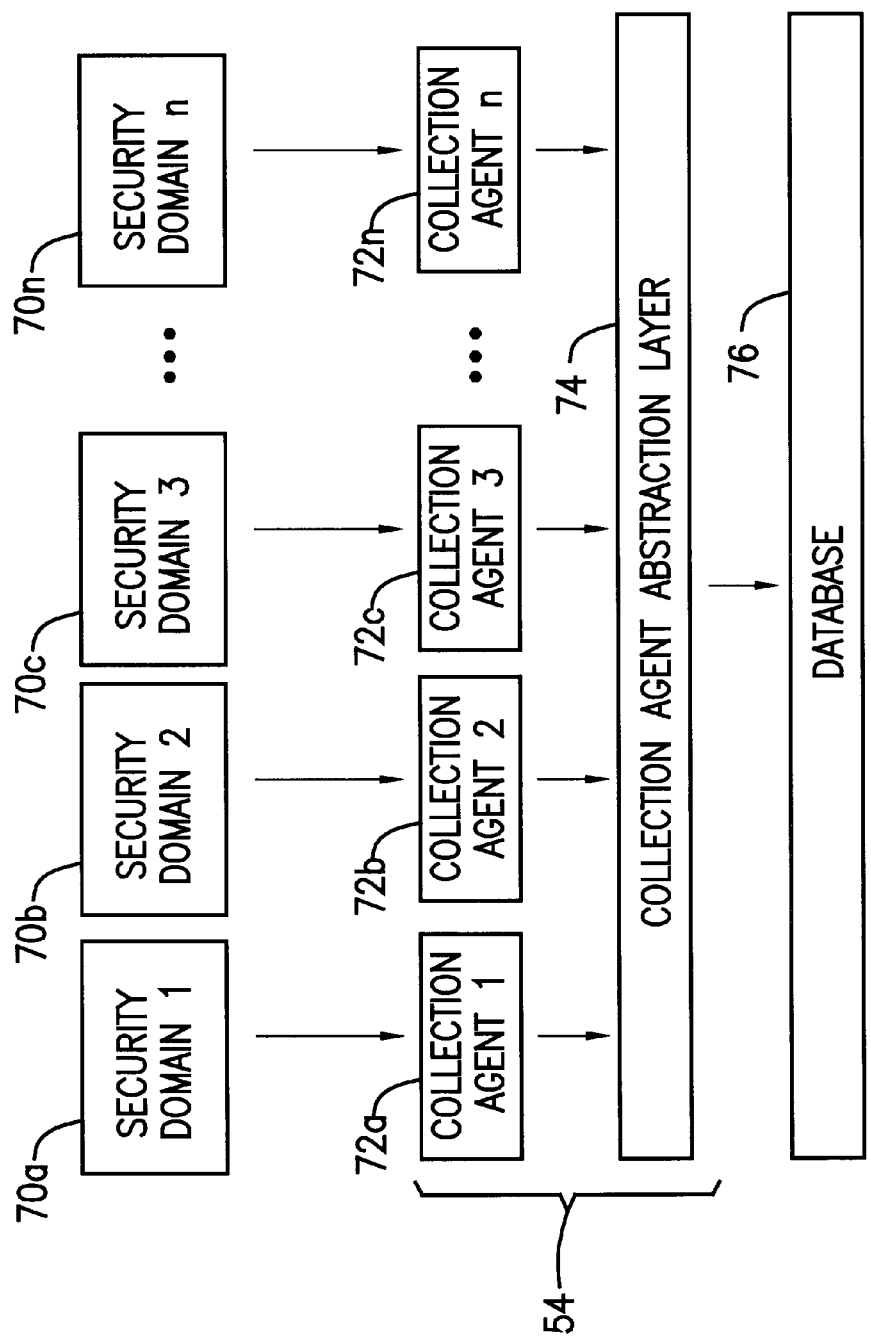
FIG. 3a is a block diagram and flow-chart delineating the information flow and major functions of the system of FIG. 2.
Figure 3B:
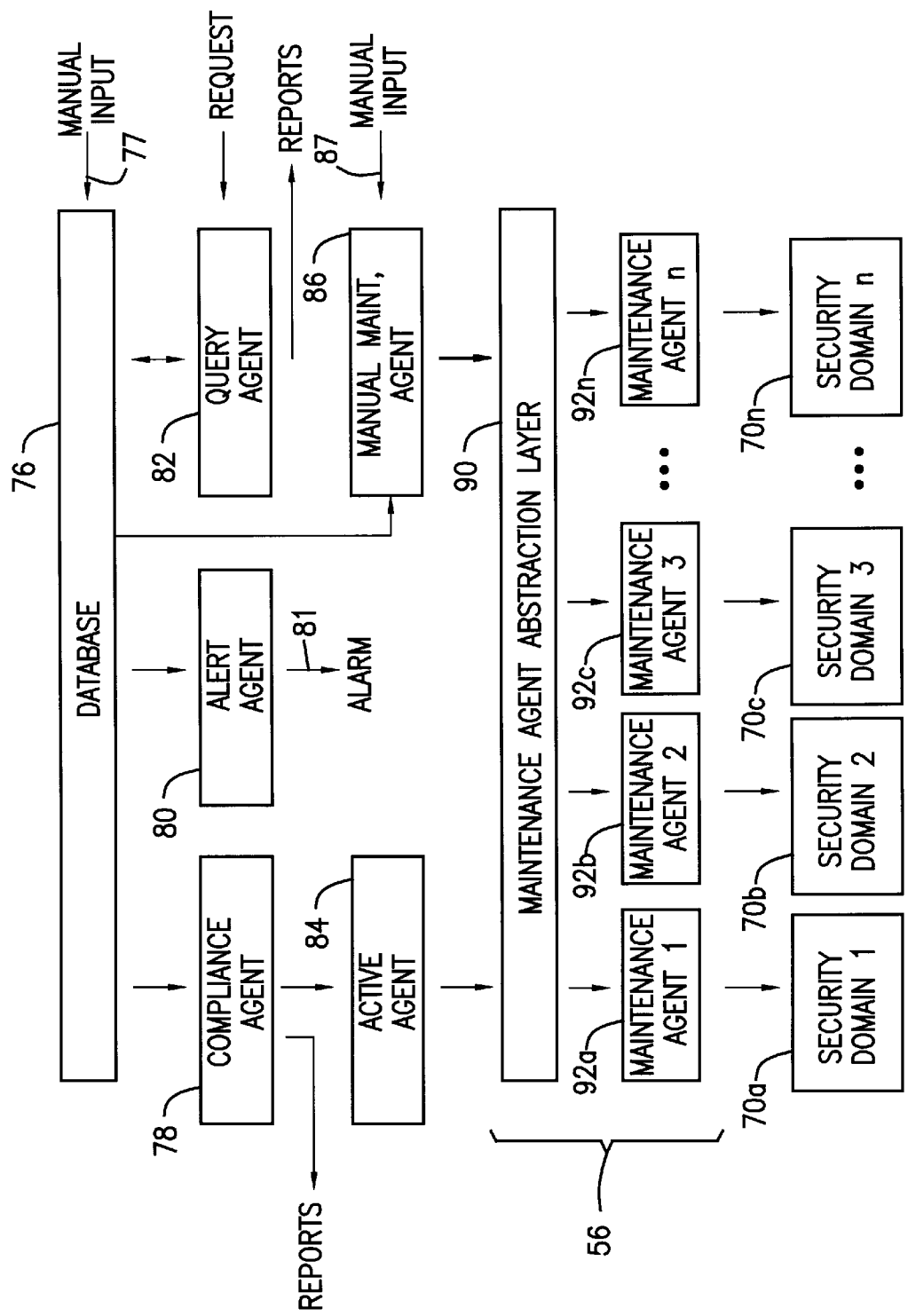

Reference is now made to FIGS. 3a and 3b which explain in greater detail the system configuration and overall software flow of the system of the present invention. The technology specific layer consists of many groups of security related software modules which are depicted in FIG. 3a as security domains 70a, 70b, 70c . . . 70n. The security domains 70a–70n represent workstations, servers, LANs, Windows NT and other such computer software or hardware that are of interest to security officers and auditors. The definition of a security domain depends on the security architecture of the platform. For example, Windows NT normally manages security at a domain level, managing a group of machines, while NetWare™ manages it on a per-machine basis. Each security domain houses its own store of security information, i.e. parameter settings, user Ids, passwords, etc.

The security domains 70a–70n communicate with collection agents 72a, 72b, 72c . . . 72n, respectively. These collection agents 72a–72n, a part of security administration system 50, represent software facilities written specifically for the corresponding operating system or system software components, for example the workstation server, LAN or NetWare™ software facility comprising the security domains 70a–70n. Therefore, there are many different collection agents, each of which is associated with a specific security domain type. The present invention has been reduced to practice with collection agents specific to NetWare™ 3.1, NetWare™ 4.0, Windows NT, two different remote access servers, RACF, ACF2, Sybase, Oracle, AS 400, VAX/VMS, Tandem, Lotus Notes, four different UNIX operating systems and an Internet firewall.

The collection agents 72a–72n use system utilities and/or APIs (Application Programming Interfaces) to extract from the individual security domains 70a–70n specific data defining security information pertaining to the system users, passwords, security groups, and where applicable:

permissions, access controllers, logon events, file access events, system management events, file attributes, software and hardware versions, password control parameters, system parameters and the like. The information they collect is passed to the collection agent abstraction layer or facility 74 for further processing.

The collection agent abstraction facility 74 comprises a rule-driven software facility that rationalizes the data collected by the collection agents 72a–72n into standardized sets of data. This allows software modules which subsequently handle the data to ignore platform specific differences, in a manner which enables further processing of security data to be handled as source-independent information. The collection agent abstraction facility 74 takes into account platform differences as well as other differences such as administrative conventions used at each specific security domain. It enhances the data by identifying account owners, thereby forming a link to personnel and organizational information. This facility 74 is a key component of the solution because it allows auditors and security officers to view their many environments with a single tool, and a single, enhanced view of the data.

The collection agent abstraction facility 74 may run on one or more computers, as may be necessitated by system considerations. Furthermore, more than one software package may run on the same machine. The collection agent abstraction facility 74 may execute on the same machine and at the same time as other software (to be described) is running.

The information developed and organized by the collection agent abstraction facility 74 is stored in the database 76. This database 76 uses off-the-shelf software for storing and receiving collected data. In an embodiment of the invention which has been reduced to practice the database 76 has been implemented through the use of the well-know Sybase™ database engine. Data rationalized by the collection agent abstraction facility 74 has been organized and stored in the embodiment that has been reduced to practice in the manner shown in the Table I below.

TABLE I

DATABASE TABLES (Technology Independent)

| Table Name | Column Name |
|---|---|
| User accounts | security domain type code |
| | security domain name |
| | user account id |
| | user account name |
| | user account last login date |
| | user account creation date |
| | user account created by id |
| | user account disabled |
| | user account name tokens |
| | user account ssn token |
| | user account department token |
| | user encrypted password |
| Privilege groups | security domain type code |
| | security domain name |
| | group name |
| Privilege group members | security domain type code |
| | security domain name |
| | group name |
| | user account id |
| Security domains | security domain type code |
| | security domain name |
| | security domain minimum password length |
| | security domain password requires alpha and num |
| | security domain password history count |

TABLE I-continued

DATABASE TABLES (Technology Independent)

| Table Name | Column Name |
|---|---|
| | security domain password reuse count |
| | security domain password pre-expired indicator |
| | security domain failed login disable count |
| | security domain workstation disable indicator |
| | security domain legal notice indicator |
| | security domain operating system version |
| | security domain operating system type |

TABLE I

DATABASE TABLES (Technology Independent)

| Table Name | Column Name |
|---|---|
| | security domain operating system patch number |
| | security domain hardware information |
| Resource access privileges | security domain type code |
| | security domain name |
| | user account id |
| | resource name |
| | resource type |
| | resource access privileges |
| Monitored files | security domain type code |
| | security domain name |
| | file name |
| | file creation data |
| | file created by |
| | file last updated date |
| | file last updated by |
| | file size |
| | file permissions |
| | file location |
| Audit events | security domain type code |
| | security domain name |
| | event code |
| | event date and time |
| | event user |
| | event success or fail indicator |
| | event file name |
| | event other information |
| Security policies | security policy minimum password length |
| | security policy password requires alpha and num |
| | security policy password history count |
| | security policy password reuse count |
| | security policy password pre-expired indicator |

TABLE I

DATABASE TABLES (Technology Independent)

| Table Name | Column Name |
|---|---|
| | security policy failed login disable count |
| | security policy workstation disable indicator |
| | security policy legal notice indicator |
| Baseline files | security domain type code |
| | file name |
| | file creation data |
| | file created by |
| User account maintenance | security domain type code |
| | security domain name |
| | user account id |
| | user account name |
| | user account disabled |
| | user account ssn token |
| | user account department token |
| | maintenance action code |
| Privilege groups maintenance | security domain type code |
| | security domain name |

TABLE I-continued

DATABASE TABLES (Technology Independent)

| Table Name | Column Name |
|---|---|
| | group name |
| | maintenance action code (add. remove) |
| Privilege group members maintenance | security domain type code |
| | security domain name |
| | group name |
| | user account id |
| | maintenance action code (add. remove) |
| Resource access privileges maintenance | security domain type code |

TABLE I

DATABASE TABLES (Technology Independent)

| Table Name | Column Name |
|---|---|
| | security domain name |
| | user account id |
| | resource name |
| | resource type |
| | resource access privileges |
| | maintenance action code (add. remove. change) |

The database component 76 also includes graphical user interface (GUI) programs that allow the system's administrators to maintain "static" tables, such as the security policy and base file tables, as shown in Table I.

Referring now to FIG. 3b, note that the standardized information in the database 76 is accessible to several different software facilities identified as the compliance agent 78, the alert agent 80 and the query agent 82.

The compliance agent software 78 is software that analyzes collected data to determine if user and system data complies with security policy requirements. This component of the invention is another key component of the solution, which allows auditors and security officers to automatically monitor the computer network security environments. In the prior art, security officers had to manually check the settings for each machine, LAN, domain, etc. The compliance agent 78 produces exception reports identifying non-complying systems and users, and also passes its findings to a system component called the active agent 84 for further processing.

The active agent 84 is software that determines whether and how to bring non-complying computer subsystems into compliance. To this end, the active agent 84 issues instructions and commands to the maintenance agent abstraction layer or facility 90. Typical instructions are to disable user accounts of terminated employees, disable accounts that have not been used recently, change server parameters to ensure adequate password rules and force users to change their non-compliant passwords at the next logon, when this is warranted. The active agent 84 can be suppressed for certain user accounts or certain ones of the security domains 70a–70n, based on exception records stored in the database 76. For example, administrator or supervisor accounts may be dormant for many months on a particular computer, but must not be disabled or deleted. The active agent 84, operating in conjunction with the compliance agent 78 constitutes a self-policing, self-enforcing security system that operates automatically to keep the individual security domains 70a–70n in compliance with company security policies and regulations.

Figure 4A:
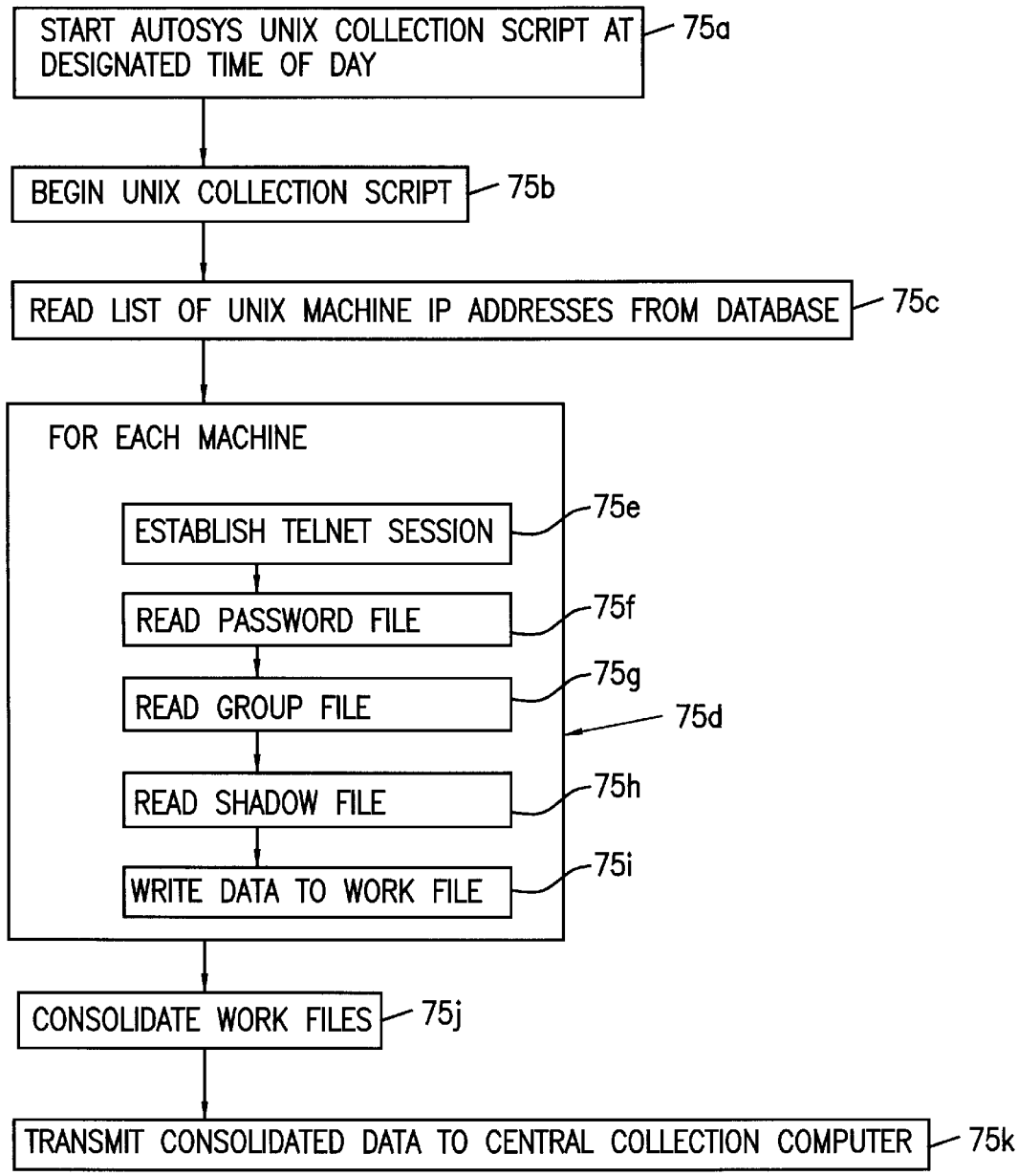
FIGS. 4a–4i are flow charts depicting major functions that are carried out by various components of the invention.
Figure 4B:
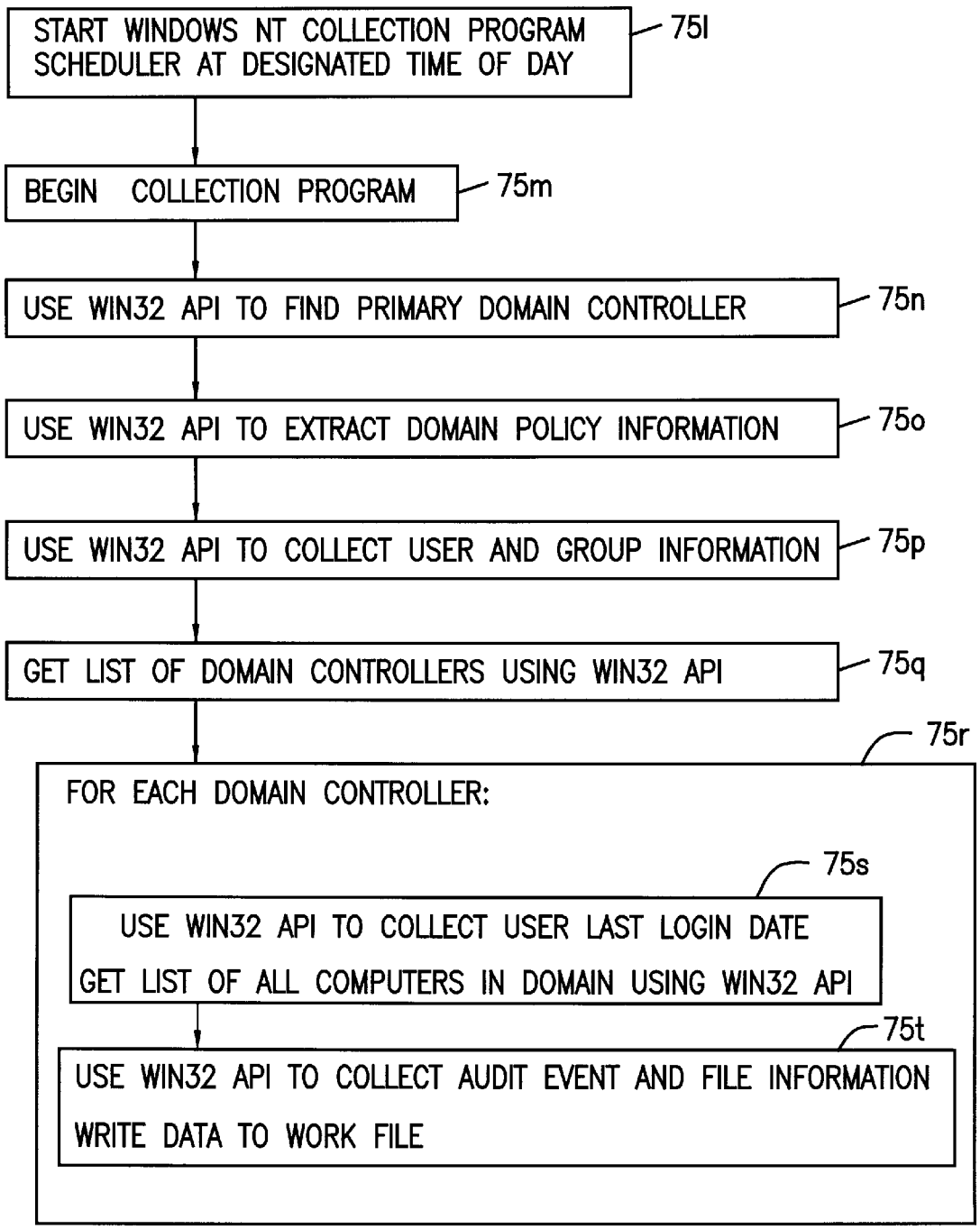
Figure 4C:
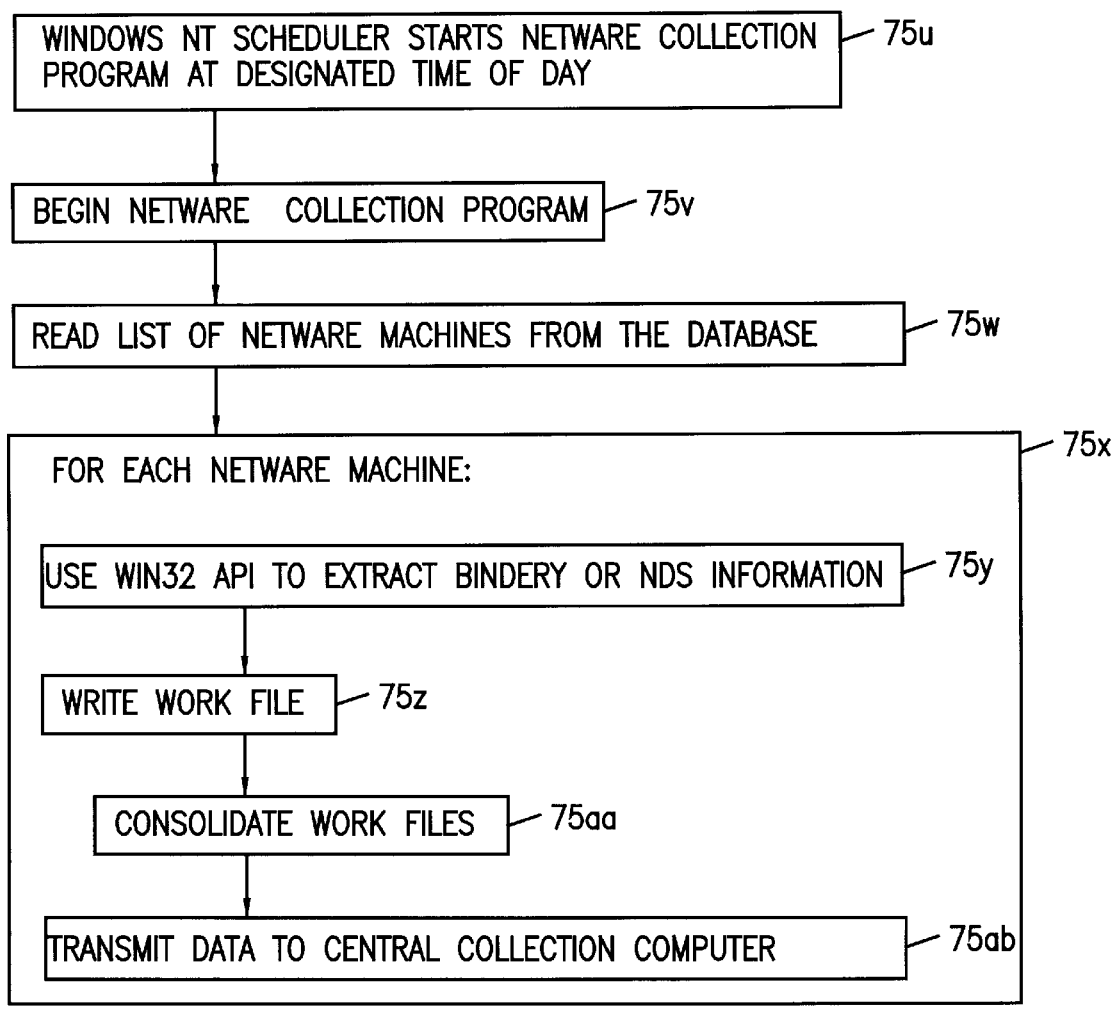
Figure 4D:
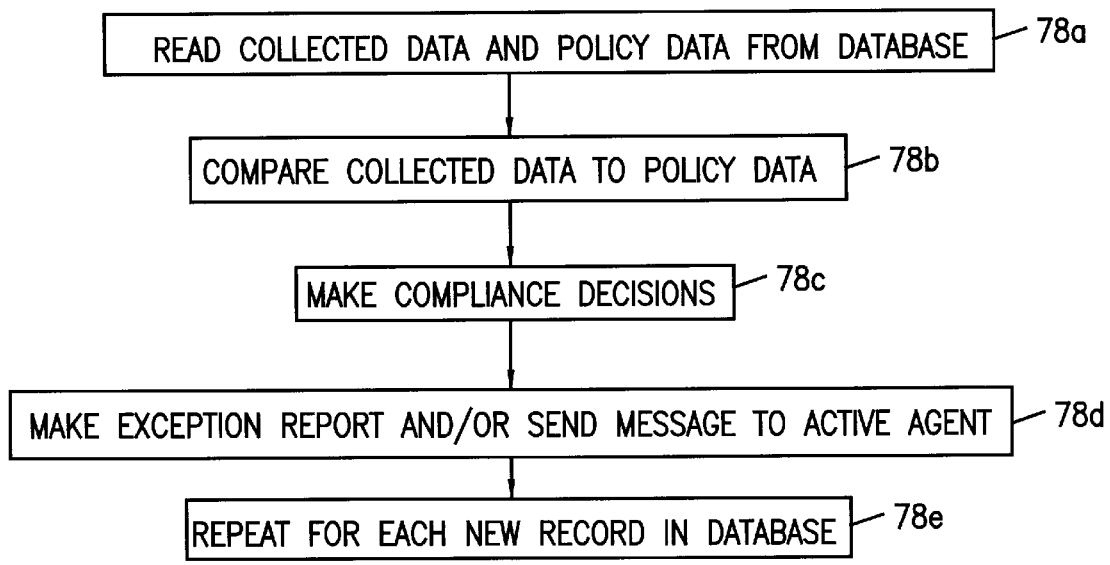
Figure 4E:
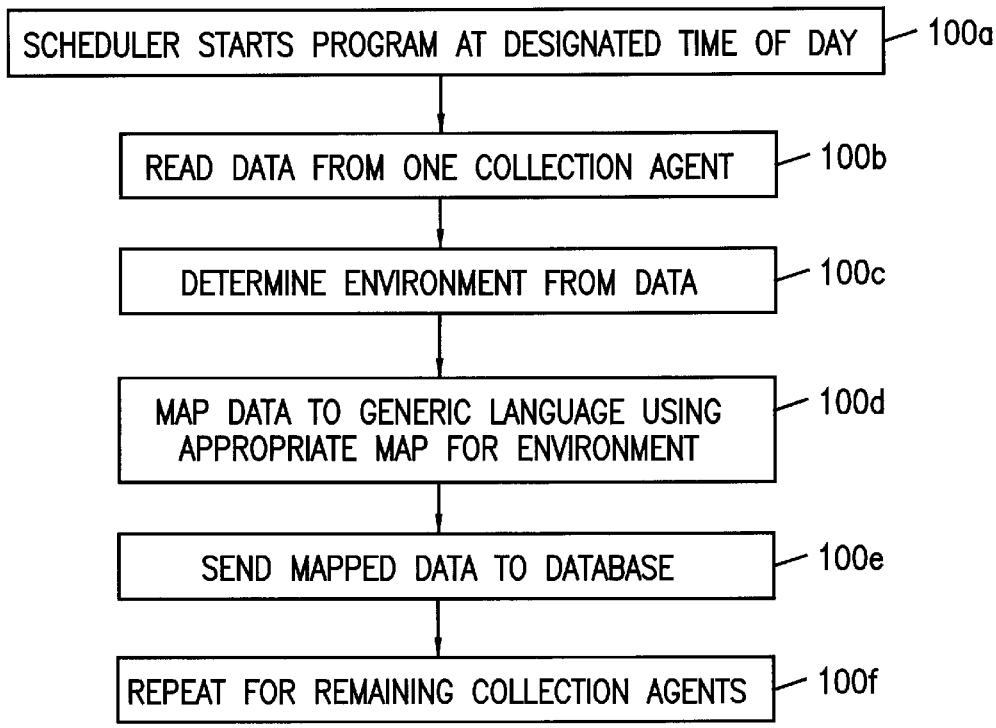
Figure 4F:
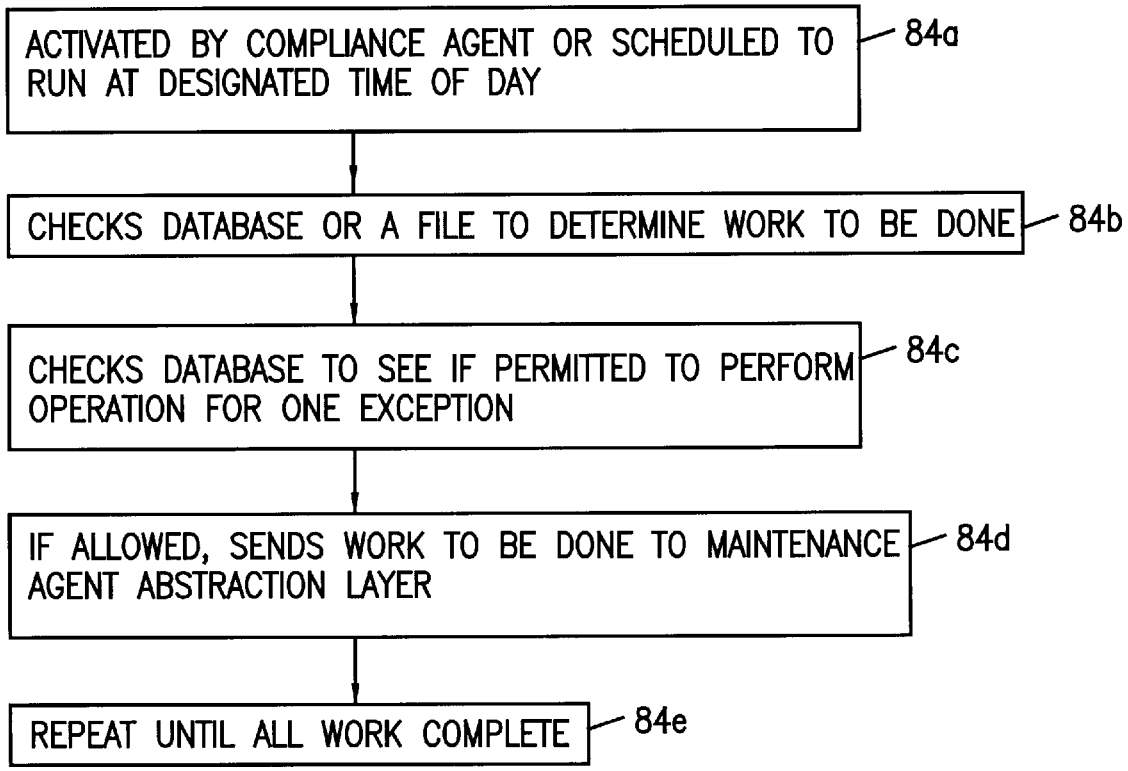

The logical flow and key software steps of the active agent comprise the self-explanatory steps 84a, 84b, 84c, 84d and 84e shown in FIG. 4f. The interaction of the active agent 84 with a data block 76d of the database 76, which contains exception parameters, and with other components of the invention is illustrated in FIG. 6c.

Typical instructions of the active agent 84 includes such instructions as to disable user accounts of terminated employees, disable accounts that have not been used recently, change server parameters to ensure adequate password rules and force users to change their non-compliant passwords at the next logon. The active agent 84 can be suppressed for certain user accounts or security domains, based on exception records stored in the database 76.

Commands and instructions concerning security measures to be taken relative to the security domains 70a–70n are also received by the maintenance agent abstraction facility 90 from the manual maintenance agent 86. The manual maintenance agent receives manual inputs 87 which are translated into commands concerning security issues that are manually inputted by the administrator or security officer of the system of the present invention.

The maintenance agent abstraction facility 90 is accordingly configured to received hardware and software independent instructions from the active agent 84 and from the manual maintenance agent 86. It converts these instructions into general hardware and software instructions that pertains to the individual platforms, i.e. security domains 70a–70n. More specifically, the maintenance agent abstraction facility 90 passes the instructions and commands to the individual maintenance agents 92a–92n. Each of these maintenance agents 92a–92n communicates exclusively with a corresponding one of the security domains 70a–70n and is designed to convert the general hardware and software instructions to specific instructions that can be understood by the individual platforms, i.e. security domains 70a–70n. Since the data collection is standardized by the collection agent abstraction facility 74 and the issuance of instructions to the security domains 70a–70n is also standardized in the maintenance agent abstraction facility 90, the invention obviates the need for separate local databases. This allows account maintenance to be done using any available tools such as native environment tools, or by the manual maintenance agent 86 or the active agent 84 working in conjunction with the compliance agent 78.

Internally (FIG. 9b), the maintenance agent abstraction facility 90 receives incoming platform independent instructions 93 (via the manual maintenance agent 86) and requests 95 involving requests for changes and deletions (via the active agent 84). It then parses and validates these requests as shown at step 97. It converts the parsed requests into platform-specific requests as shown at steps 99a and 99b of FIG. 9b. It does this by consulting internal mapping tables 91 which direct movement of data from the input fields to the output fields, i.e. from the general format security instruction protocol to the protocol that is more appropriate to the individual security domains. Finally, the maintenance agent abstraction facility commands the appropriate maintenance agents 92a–92n to carry out the specific requests and/or commands. In this manner, one platform independent request might result in iterative execution of a single maintenance agent function and/or the execution of multiple maintenance agent actions depending on the request.

Figure 4G:
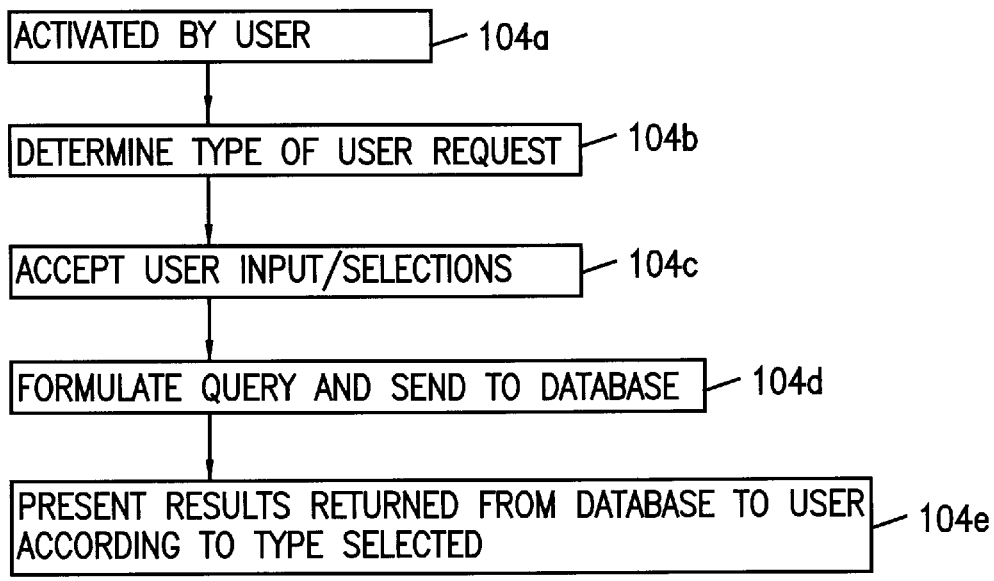

The maintenance agents 92a–92n comprise platform-specific software, so there are many different types of maintenance agents. This software invokes the security processing of the native platforms, i.e. of the security domain 70a–70n, through commands or programming APIs, to accomplish the work passed from the active agent 84 and the manual maintenance agent 86 through the maintenance agent abstraction facility 90. The broadly described program steps 93a, 93b and 93c are self-explanatorily depicted in FIG. 4i.

The specific architectures of the various maintenance agents 92a–92n can take on different forms depending on the environment. For example, in the NetWare™ environment, the maintenance agent is a Visual Basic™ application that issues NetWare™ API calls to accomplish its work. In the Windows NT environment, the maintenance agent is also a Visual Basic™ application, but uses the Win32 API. For Unix environments, the maintenance agent may be a C program that issues Unix commands and operates on the security files. In the RACF and ACF2 environments, the maintenance agents produce command files which are uploaded to the hosts and executed there. Since the maintenance agent abstraction facility 90 has already prepared most of the protocol and command structure necessary to control the security domains 70a–70n, the maintenance agents 92a–92n are generally simpler programs. The overall flow diagram of the maintenance agents 90a–90n includes steps 93a, 93b and 93c which are presented in FIG. 4i.

As described above, the system of the present invention constitutes a self-correcting data security audit system which operates both in an automatic mode and in response to specific inputs from the administrator or other security personnel through the manual maintenance facility 86. The invention automatically takes actions and changes system parameters or user parameters as necessary. The invention automatically, reliably and consistently captures all of the security data from all of the different platforms, consolidates the data and operates on it in accordance with a common format and protocol. It then acts on that information to control the system, again employing a common format that gets translated only at the last layer via the maintenance agents 92a–92n to fit the specific formats required by the security domains 70a–70n. Additional functions and features of the aforementioned components of the system of the present invention are described in further detail with reference to the remaining figures.

FIGS. 4a–4c provide three examples of procedures used in the collection agents 72a–72n by setting forth various process steps executed in those elements of the instant invention. More specifically, FIG. 4a shows the steps 75a, 75b, 75c, 75d, 75e, 75f, 75g, 75h, 75i, 75j and 75k for a Unix controlled security domain. FIG. 4b shows steps 75l through 75t for a Windows NT security domain and FIG. 4c the steps 75u–75ab for a NetWare™ environment. In this connection, Table II reproduced below shows the data that is collected by the collection agents 72a–72n and passed to the collection agent abstraction facility 74, via database 76.

TABLE II

COLLECTION AGENT OUTPUT FIELDS

| Field Name | Unix | NT | NetWare |
|---|---|---|---|
| USER ACCOUNT RELATED | | | |
| user account id | x | x | x |
| user account name | x | x | x |
| user account last login date | x | x | x |
| user account creation date | x | x | x |
| user account created by id | | | x |
| user account disabled | x | x | x |
| user encrypted password | x | x | |
| SECURITY GROUP RELATED | | | |
| group name | x | x | x |
| group user accounts | x | x | x |
| SECURITY DOMAIN RELATED | | | |
| security domain type code | x | x | x |
| security domain name | x | x | x |
| security domain minimum password length | x | x | x |
| security domain password requires alpha and num | | | |
| security domain password history count | | x | x |
| security domain password reuse count | | x | |
| security domain password pre-expired indicator | x | | x |
| security domain failed login disable count | x | x | x |
| security domain workstation disable indicator | | | |
| security domain legal notice indicator | x | x | |
| security domain operating system version | x | x | x |
| security domain operating system type | x | x | x |
| security domain operating system patch number | x | x | x |
| security domain hardware information | x | x | |
| RESOURCE ACCESS RELATED | | | |
| user account id | | | |
| resource name | x | x | x |
| resource type | x | x | x |
| resource access privileges | x | x | x |
| FILE RELATED | | | |
| file name | x | x | x |
| file creation data | x | x | x |
| file created by | | x | x |
| file last update date | | x | |
| file last updated by | | x | |
| file size | x | x | x |
| file permissions | x | x | x |
| file location | x | x | x |
| AUDIT EVENT RELATED | | | |
| event code | | x | x |
| event date and time | | x | x |
| event user | | x | x |
| event success or fail indicator | | x | x |
| event file name | | x | x |
| event other information | | x | x |

For example, the collection agents are able to extract and report to the collection agent abstraction facility the "user account ID" for the Unix, Windows NT and NetWare™ platforms. However, a field such as the "user account created by ID" can only be gathered from the NetWare™ platform. Table II further shows that the different data pieces can be grouped into different categories, for example, a group of data which is "user account" related and another which is "security group" related, etc.

Figure 5A:
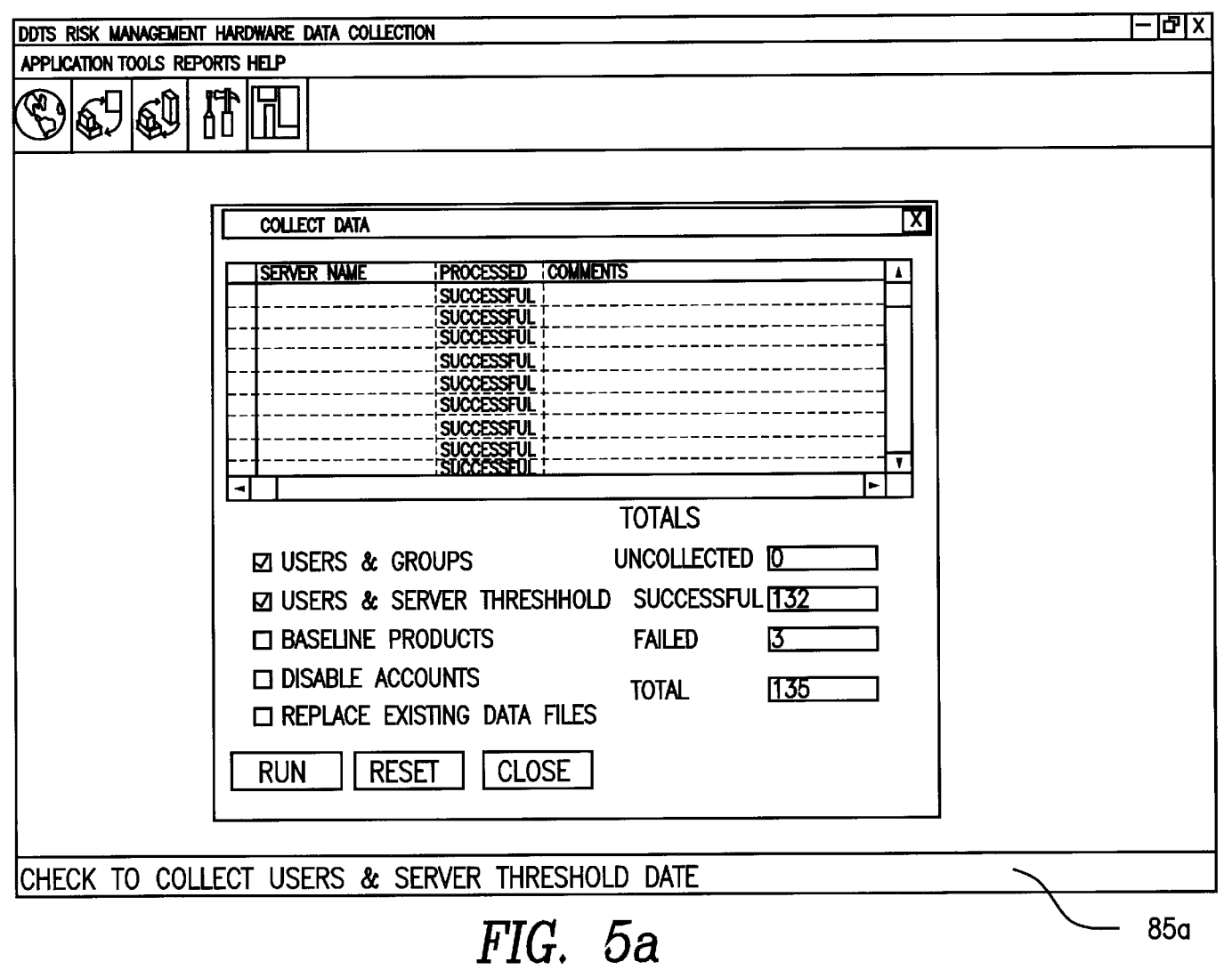
Figure 5B:
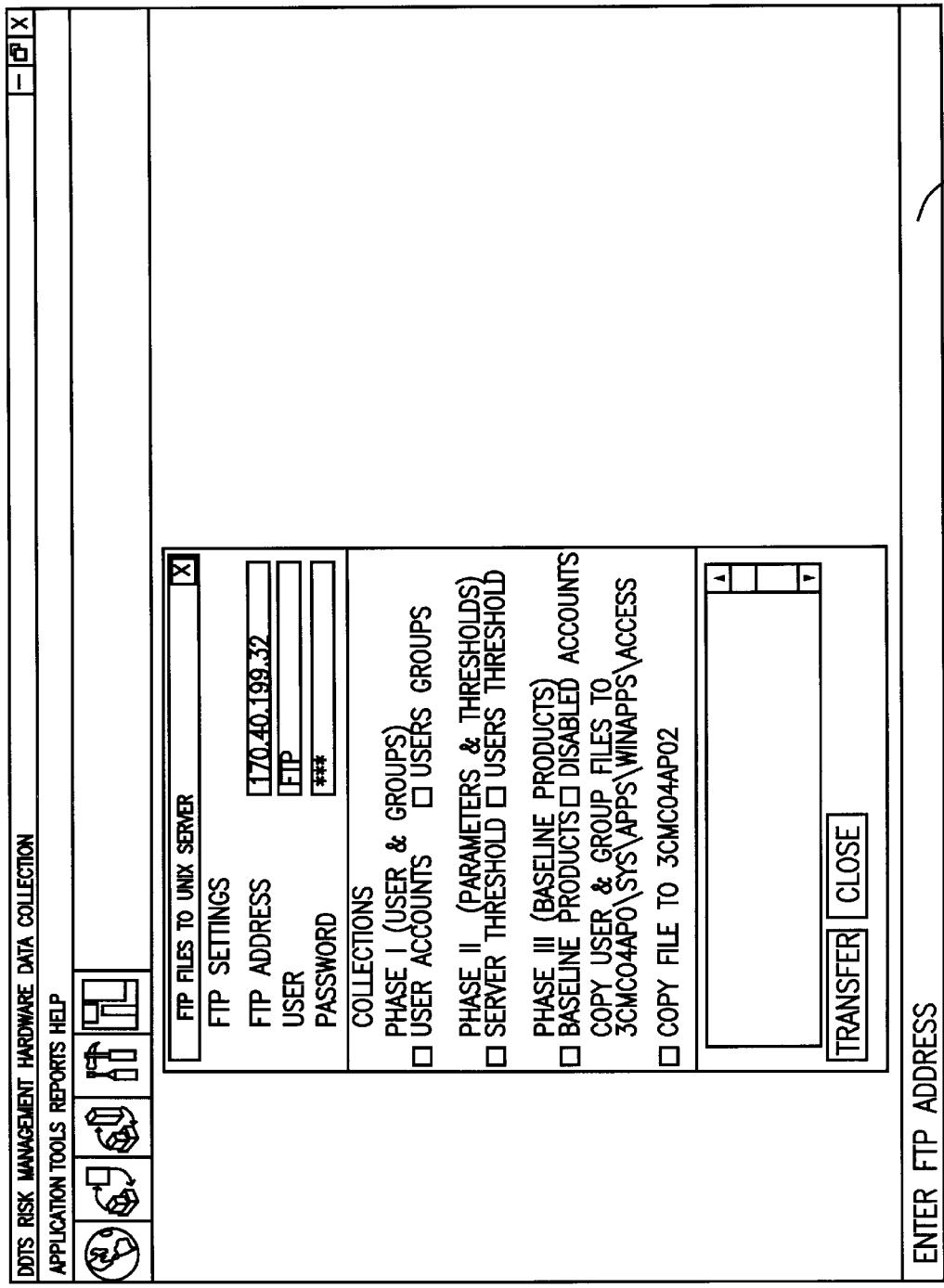
Figure 5C:
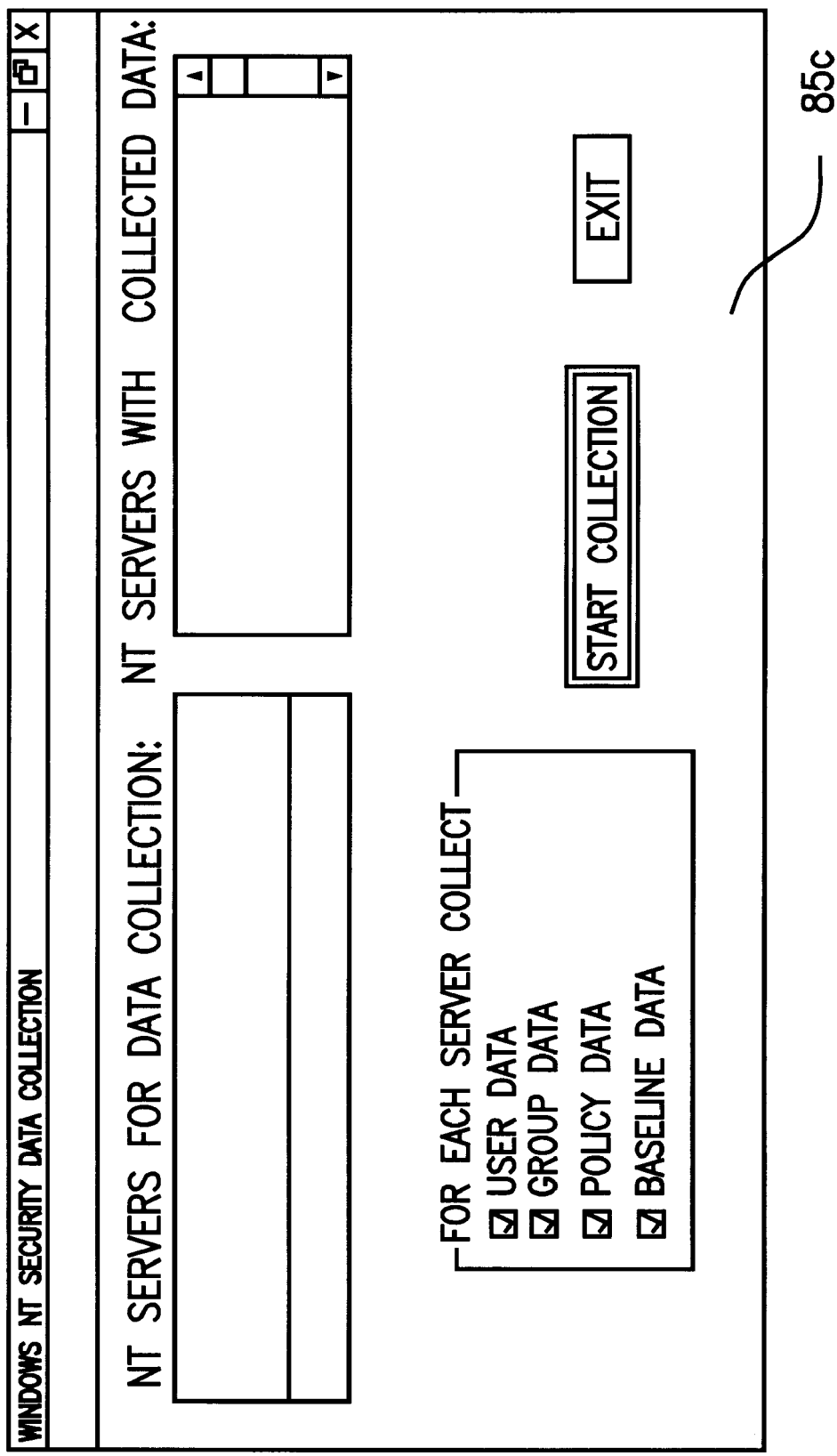
Figure 5D:
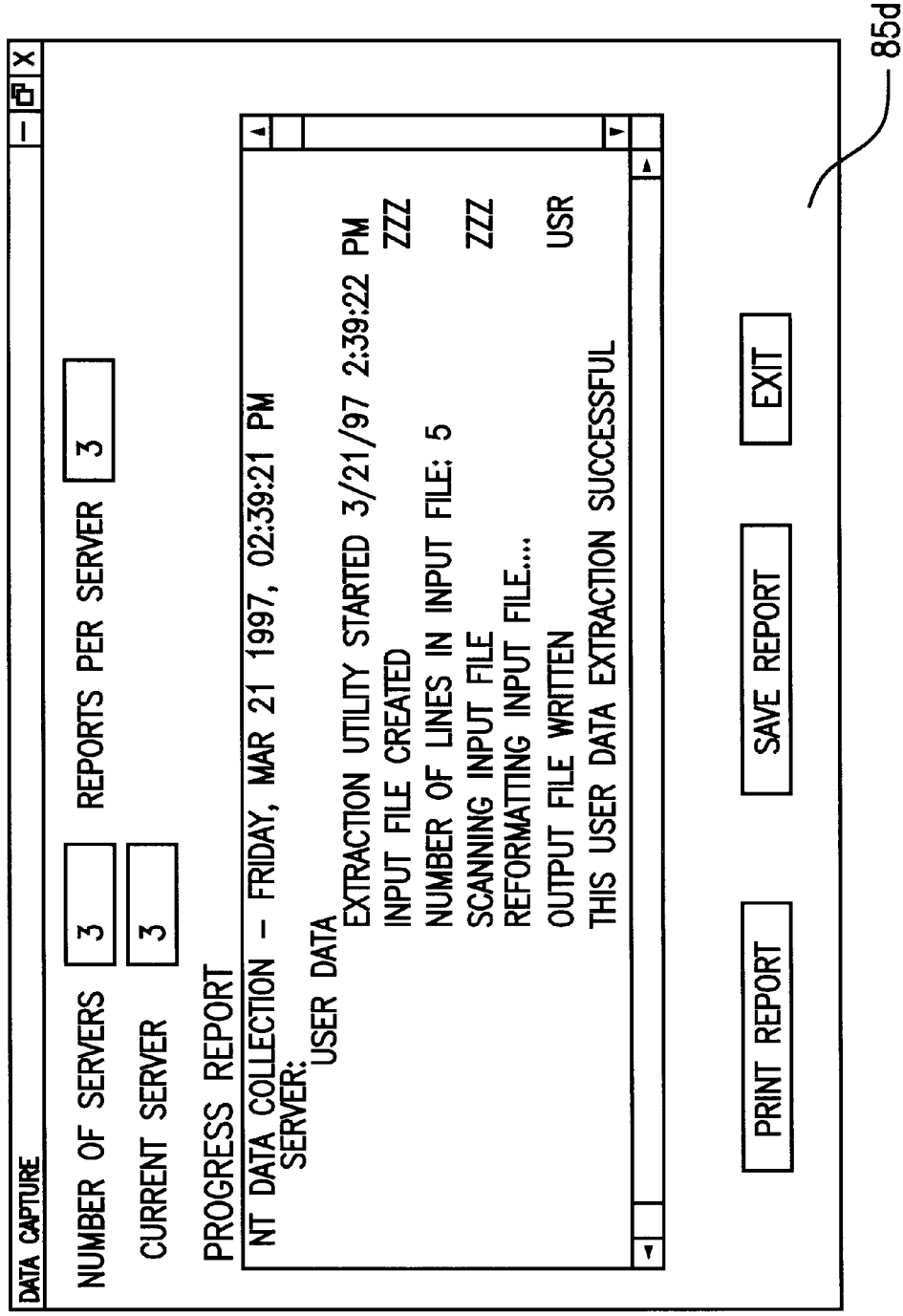

FIGS. 5a and 5b show, respectively, computer screens 85a, 85b provided to the system operator to enable the selection and control of collection activities and the entering of necessary parameters for the NetWare™ environment. Sample screens 85c, 85d for Window NT environments are shown in FIGS. 5c and 5d.

As previously noted, only information provided by the various collection agents 70*a*–70*n* is provided to the collection agent abstraction facility 74, which performs the major function steps identified in FIG. 4*e*. These steps include step 100*a* involving scheduling the starting of the program at a designated time of day. This is followed by steps 100*b*, 100*c*, 100*d*, 100*e* and 100*f* which entail such functions as reading data from the particular collection agents, determine the type of environment of the received data; mapping the data to a generic language using an appropriate map for the environment, sending the map data to the database 76 and repeating the above steps for the remaining collection agents.

FIG. 11*a* is an example of source code or control statements for a parsing utility used as a part of the implementation of the collection agent abstraction facility 74 for NetWare™ parsing. Its basic function is to rearrange and decipher platform-specific input fields into the common format. FIG. 11*b* is an example of the beginning of a Perl script used to parse and reformat detailed Windows NT security log records into the standard internal format used for audit data. FIG. 11*c* is a continuation of the Perl script of FIG. 11*b*.

While Table II presented above shows the type of data that is input to the collection agent abstraction facility 74, Table III reproduced below shows the output data fields of the collection agent abstraction facility.

TABLE III

Collection Agent Abstraction Layer Output Field
(technology independent)

USER ACCOUNT RELATED security domain type code
security domain name
user account id
user account name
user account last login date
user account creation date
user account created by id
user account disabled
user account name tokens
user account ssn token
user account department token
user encrypted password
SECURITY GROUP RELATED security domain type code
security domain name
group name
group user accounts
SECURITY DOMAIN RELATED security domain type code
security domain name
security domain minimum password length
security domain password requires alpha and num
security domain password history count
security domain password reuse count
security domain password pre-expired indicator
security domain failed login disable count
security domain workstation disable indicator
security domain legal notice indicator
security domain operating system version
security domain operating system type
security domain operating system patch number
security domain hardware information
RESOURCE ACCESS RELATED security domain type code
security domain name
user account id TABLE III-continued Collection Agent Abstraction Layer Output Field
(technology independent)

resource name
resource type
resource access privileges
FILE RELATED security domain type code
security domain name
file name
file creation data
file created by
file last update date
file last updated by
file size
file permissions
file location
AUDIT EVENT RELATED security domain type code
security domain name
event code
event date and time
event user
event success or fail indicator
event file name
event other information The major enhancement to the collected data centers around decoding information that is normally placed in the name field of each user account record. Common practice is to include name and/or payroll number and/or organization code. The name is also split into "tokens" to allow searching and facilitate analysis of collected information.

Figure 6A:
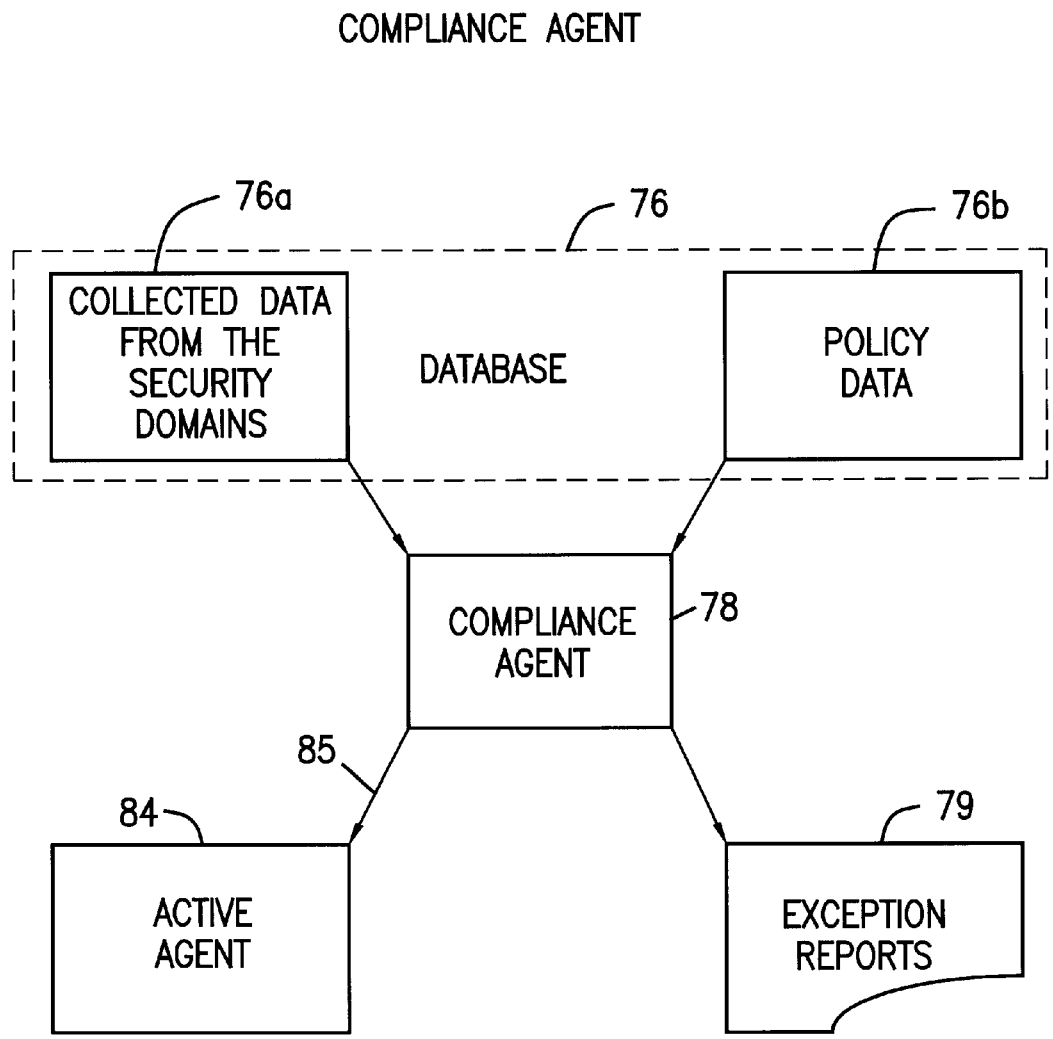
FIGS. 6a–6e are flow charts which depict interactions between various components of the system of the present invention.

As shown in FIG. 6*a*, the database 76 stores data 76*a* obtained from the security domains 70*a*–70*n* which has been rationalized and reformatted by the collection agent abstraction facility 74. It also holds policy data 76*b* which reflects the set of rules and regulations applicable to the security system which has been manually inputted by security personnel as indicated by reference numeral 77 in FIG. 3*b* or pre-stored therein. The compliance agent 78 serves to review the reformatted data 76*a* and the policy data 76*b* and to compare the same. Whenever the collected data indicates non-compliance or less stringent compliance than standard policy requirements an exception is triggered and appropriate exception reports 79 are generated. Certain ones of the exception reports 79 may also be sent to the active agent 84 as indicated by line 85, for further processing and action by the active agent. FIGS. 7*a*, 7*b* and 7*c* are examples of compliance agent reports, i.e. the exception reports 79.

The following is a partial list of exception conditions:

minimum password length is too short password life is longer than 90 days more than 3 failed logins are being allowed before an account is disabled concurrent logins are allowed account has not been used in 90 days and is not disabled account was used after employee termination date Certain conditions can be automatically fixed by the system. Unused accounts can be automatically disabled. Password length and life parameters can be changed. In cases where automatic correction is desired, the compliance agent 78 sends instructions to the active agent 84 specifying what needs to be changed. The active agent 84 can then correct the exception condition by sending the appropriate instruction to the maintenance agent abstraction facility 90.

FIG. 4d presents in a self-explanatory manner the key steps 78a, 78b, 78c, 78d and 78e that are carried out by the compliance agent 78.

Figure 4H:
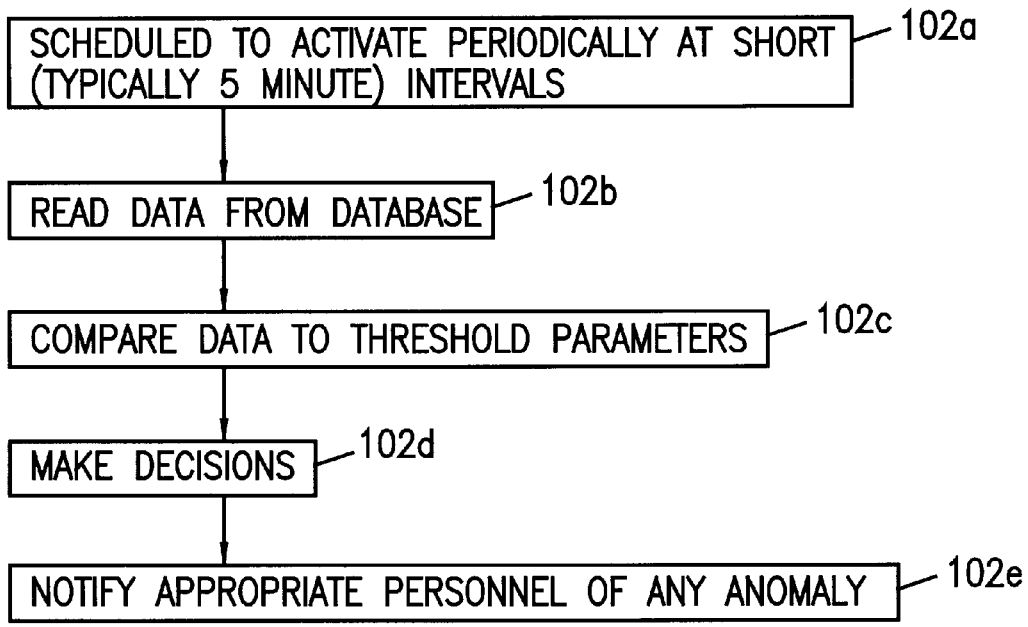
Figure 4I:
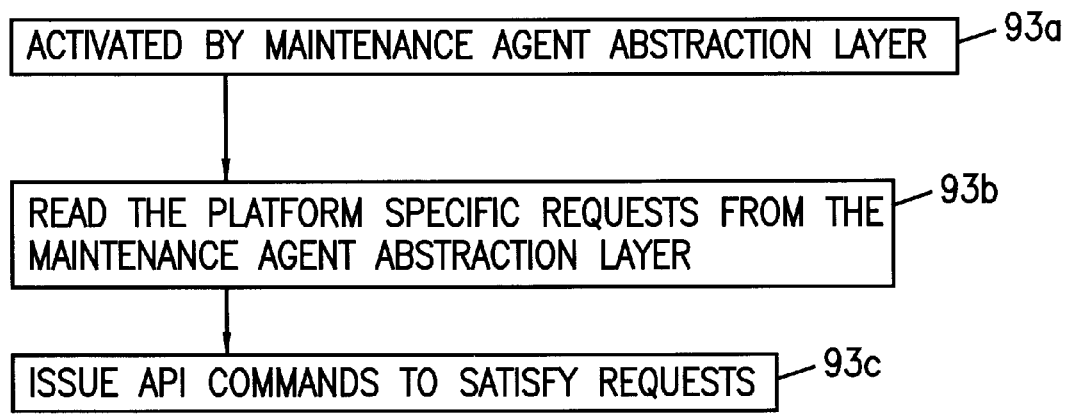

Referring again to FIG. 3b, the alert agent 80 comprises software that analyzes collected data residing in the database 76 to determine if unusual security activities have taken place. An example of such activity is an unusually large increase in the number of failed access attempts, repeated failed attempts from a single user or location, or modification of certain key security or operating system files within any one of the security domains 70a–70n. The alert agent 80 automatically notifies appropriate personnel by e-mail, phone and/or pager. This is indicated by the alarm arrow 81 in FIG. 3b. The alert agent 80 is unique in that it is able to monitor across dissimilar environments, protecting against more sophisticated intrusion attacks that cannot be detected with previous generations of tools, which could only monitor one security domain at a time. The main sequence of program events taking place at the alert agent 80 are indicated in FIG. 4h. The logic of the alert agent 80 is shown in FIG. 4h to include the major software steps 102a, 102b, 102c, 102d and 102e, which are self-explanatorily presented.

Figure 6B:
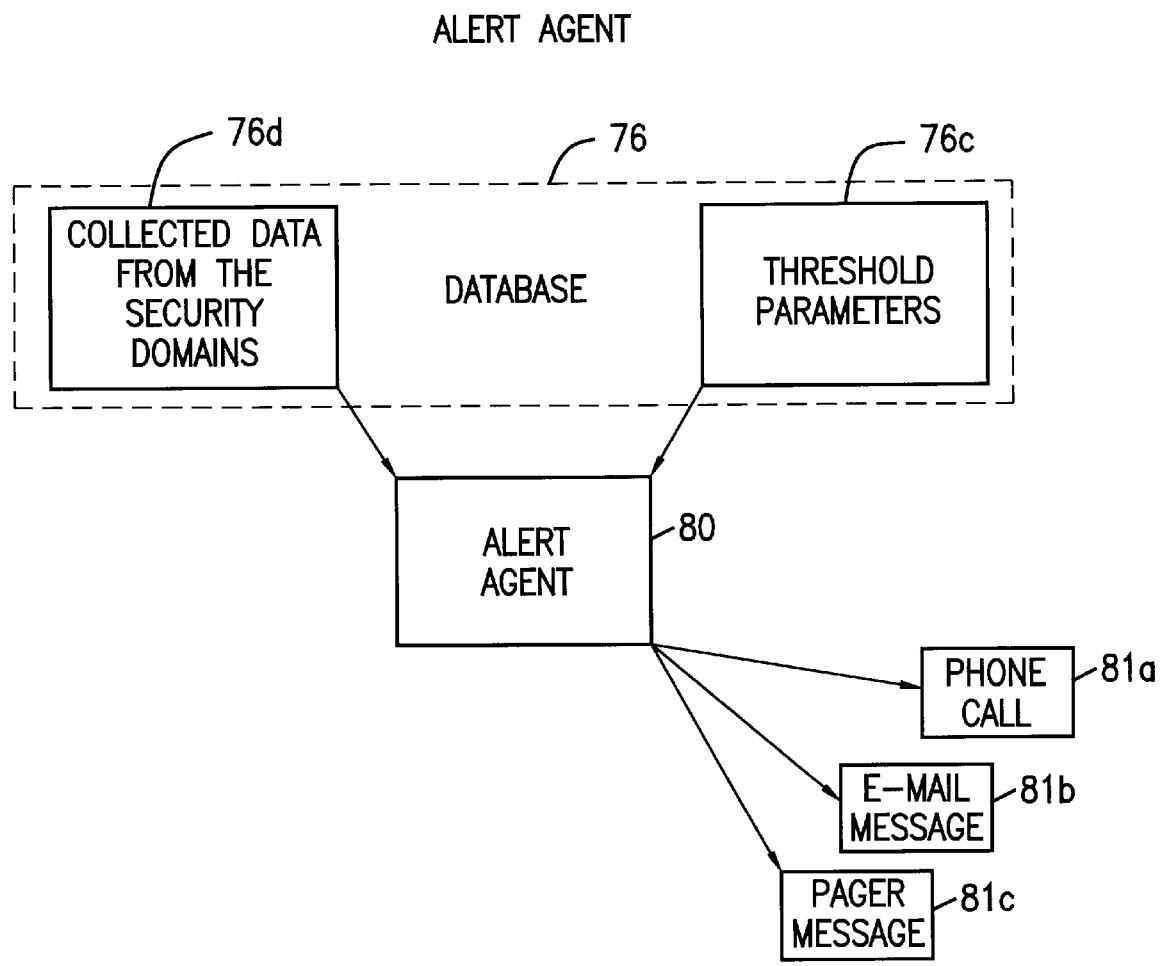
Figure 6C:
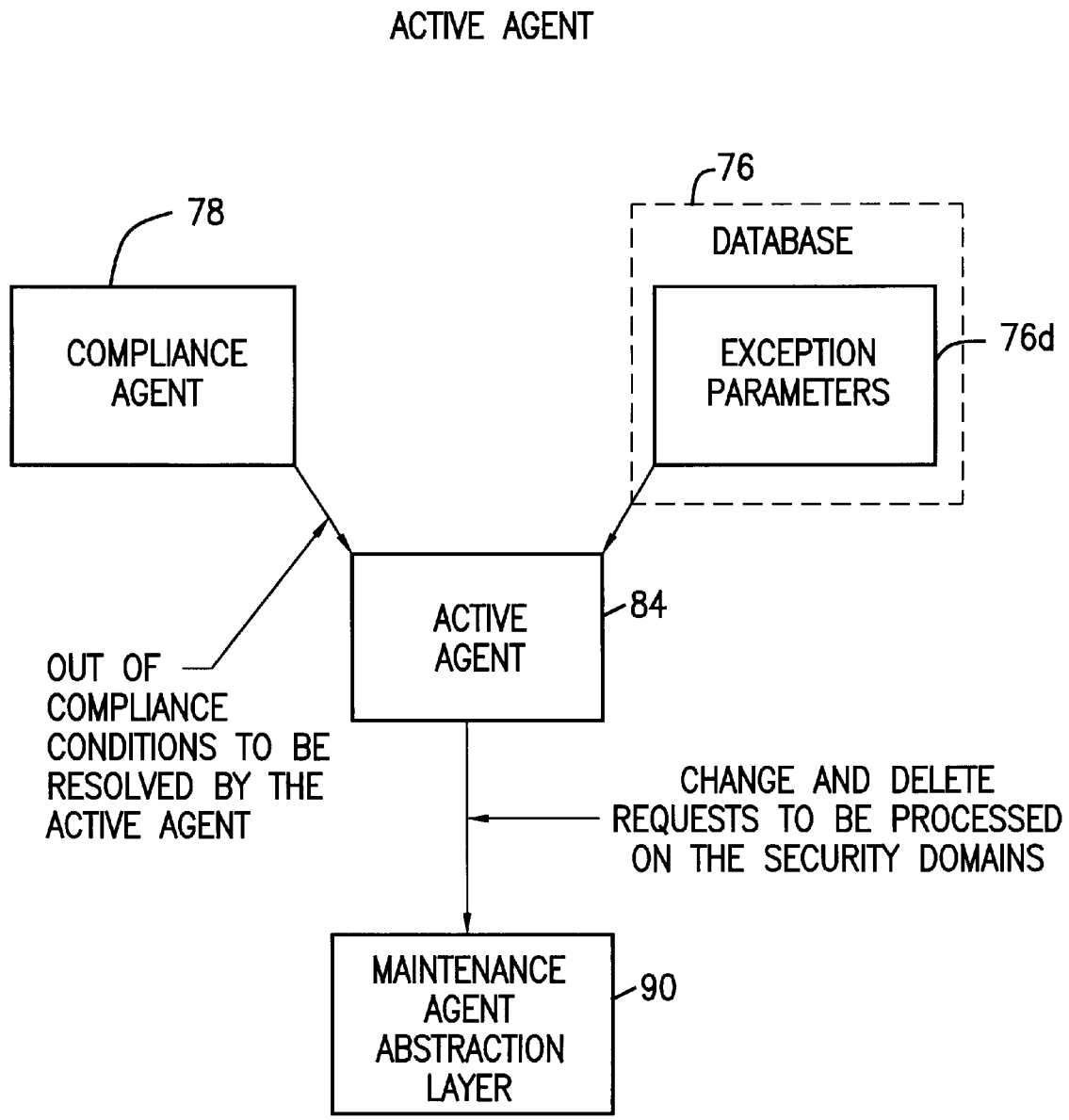

As further shown in FIG. 6b, the database 76 also includes a threshold parameters data block 76c and the alert agent 80 is responsive both to the security domain collected data 76a and to the threshold parameters 76c. The alert agent 80 scans the collected data looking mostly at an event audit table which has the general organization shown in FIG. 8a (in which server names and user IDs have been blanked out for security reasons). It counts failed login attempts and failed file accesses by user, domain, location, file name, computer name, etc. It reports exception conditions based on reaching thresholds that are kept in the database as parameters 76c. The alert agent 80 also reports on single critical events such as a change made to a key security control (e.g. the stopping of the logging or counting of failed logins), or deactivation or failure of a security component (for example clearing of a security log file). The alarm line 81 of FIG. 3b can result in the automatic placements of a phone call 81a or an e-mail message 81b or a pager message 81c as indicated in FIG. 6b.

The query agent 82 of FIG. 3b similarly interfaces with the database 76 and comprises an interface software that allows system users to access the database information. Both standard and ad-hoc queries are supported by the software implementation of the agent 82. The query agent 82 has been reduced to practice in a form that uses an Internet/Intranet technology, i.e. a web browser, to allow access with a minimum of connectivity and software distribution problems. Any query tools that handles Sybase™ could be used in the implementation. The tool used in the embodiment that has been reduced to practice is Sybperl™. The flow logic of the query agent 82 is shown in FIG. 4g to include major software steps 104a, 104b, 104c, 104d and 104e, which are self-explanatorily presented.

Figure 6D:
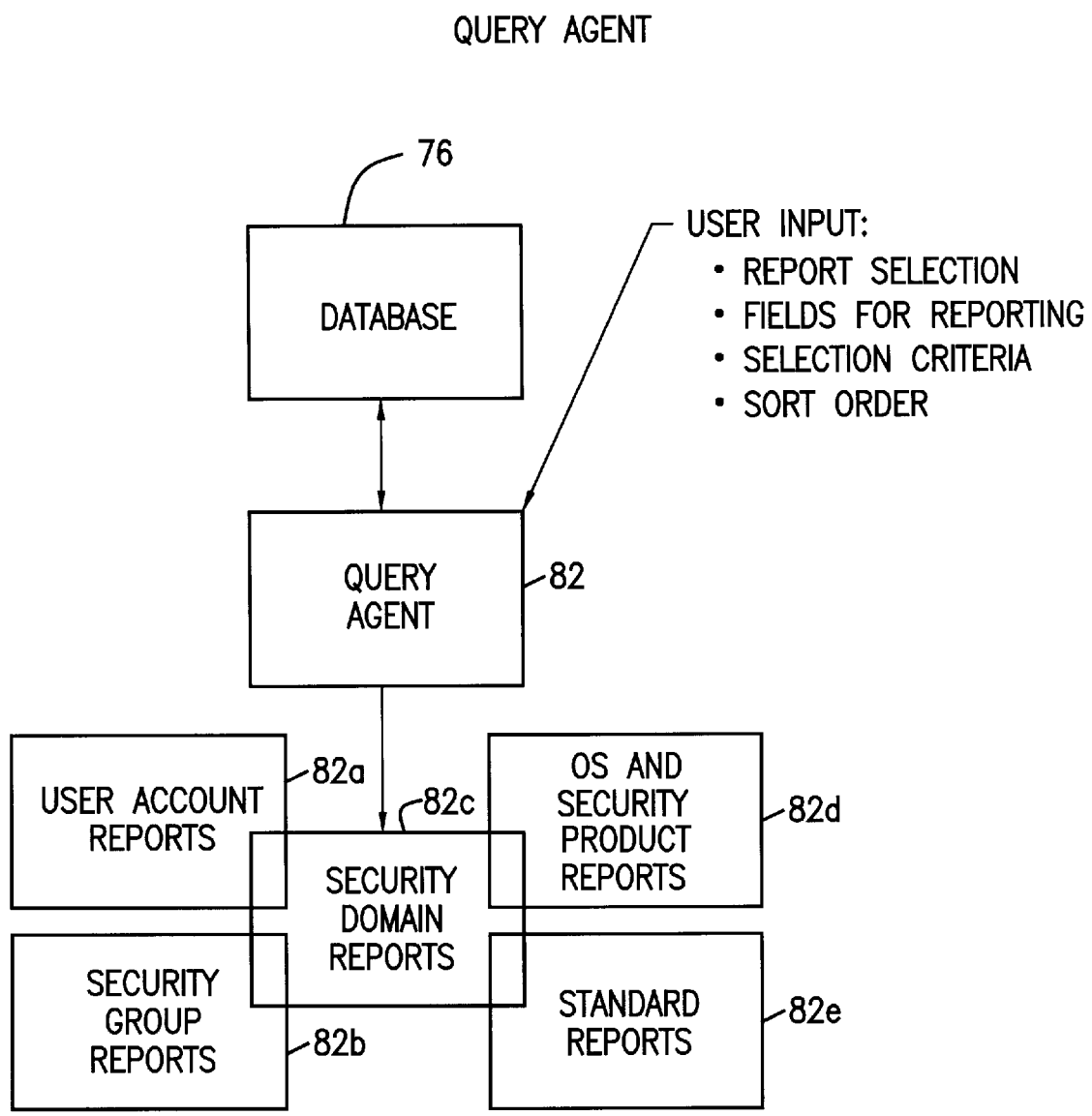

As shown in FIG. 6d, the query agent 82 supports queries on the following data objects: user accounts 82a, security groups 82b, security domain reports 82c, operating system and security product reports 82d and standard audit/alert reports 82e. The foregoing queries on objects 82a through 82b allow the user to select which data fields to report, sort order, and record selection criteria.

Figure 8B:
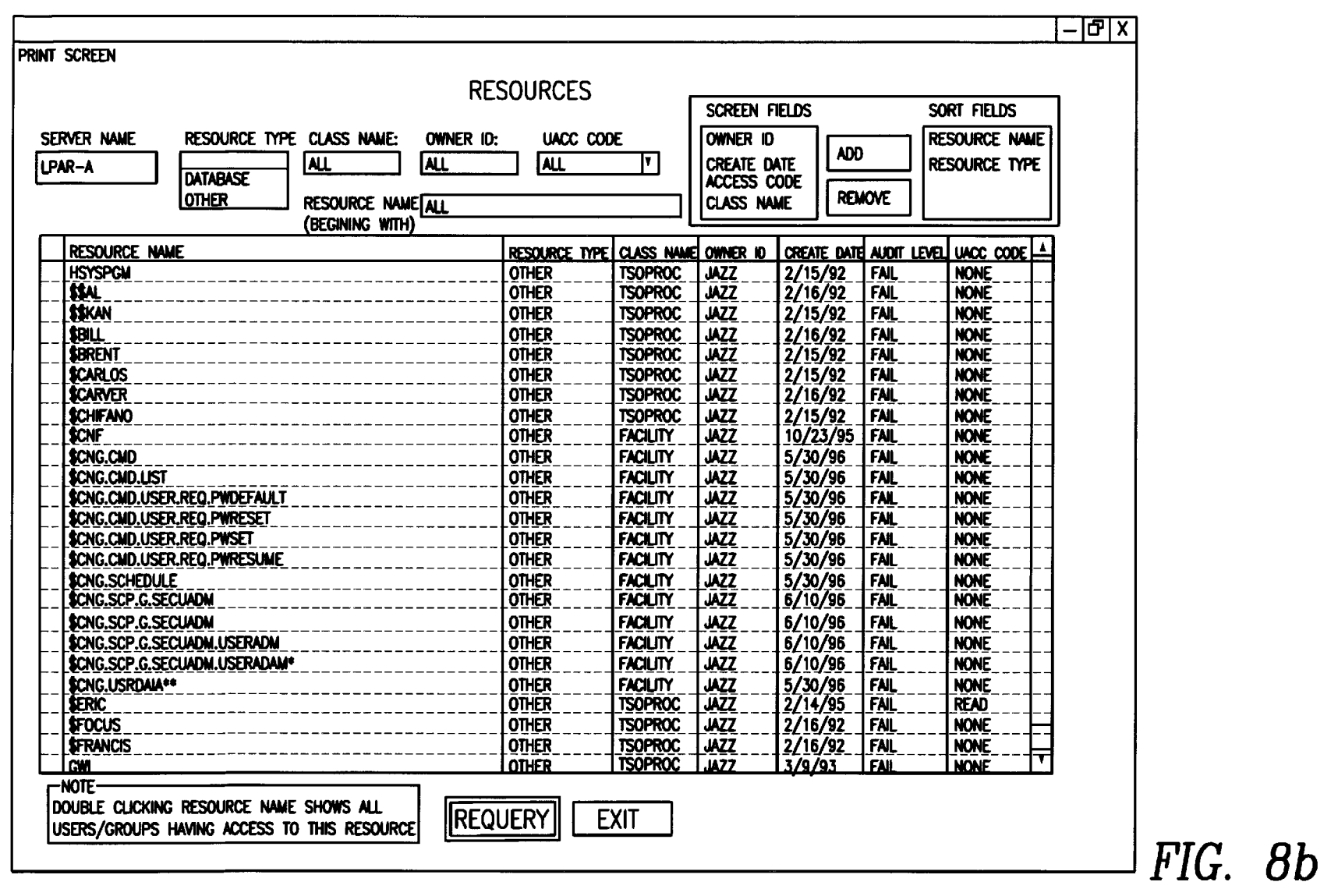

In addition to customizable queries, the query agent 82 also supports standard reports 82e, for example, accounts used after an employee is terminated and a report of users of "high risk applications". A typical standard report from the query agent 82 is shown in FIG. 8b.

Figure 9A:
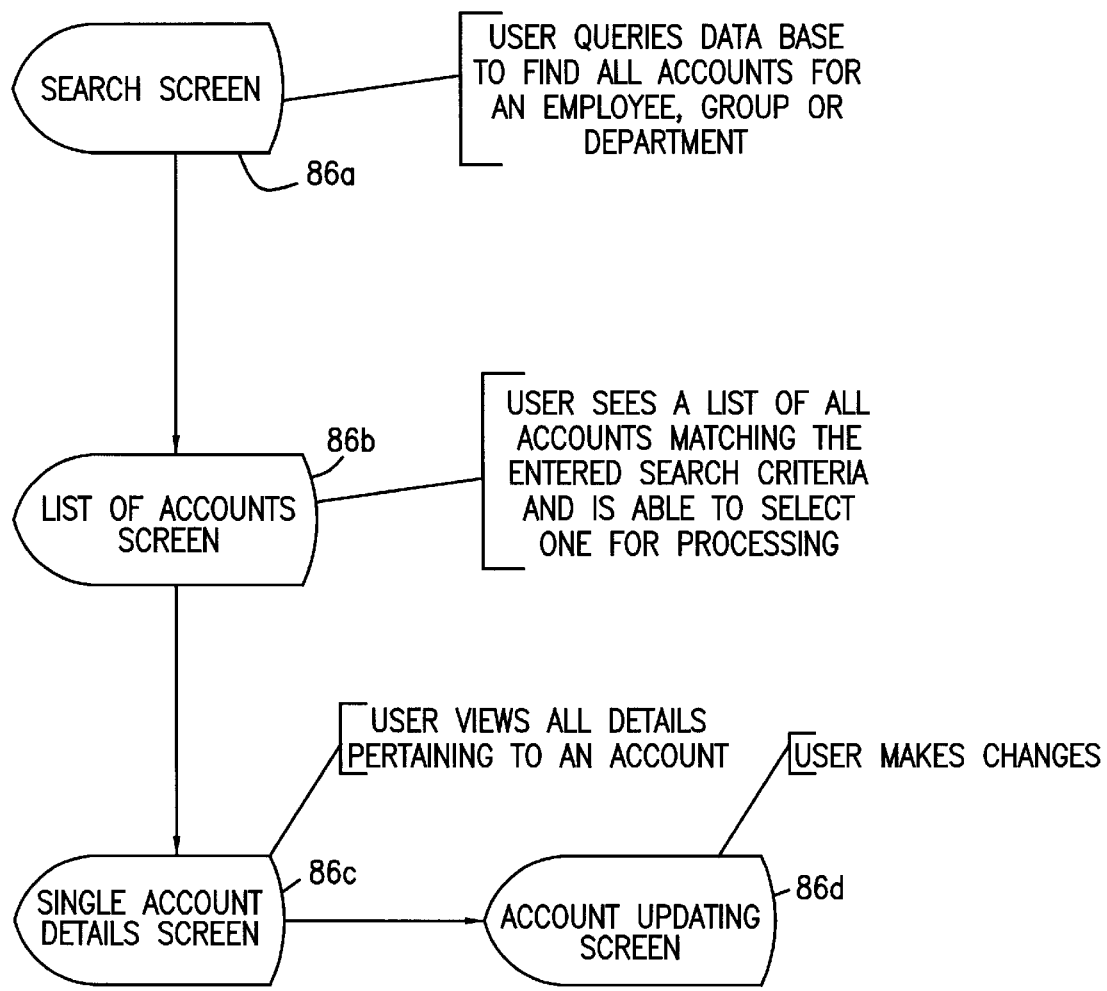
FIGS. 9a–9b are further flow charts illustrating the operation of the present invention.
Figure 9B:
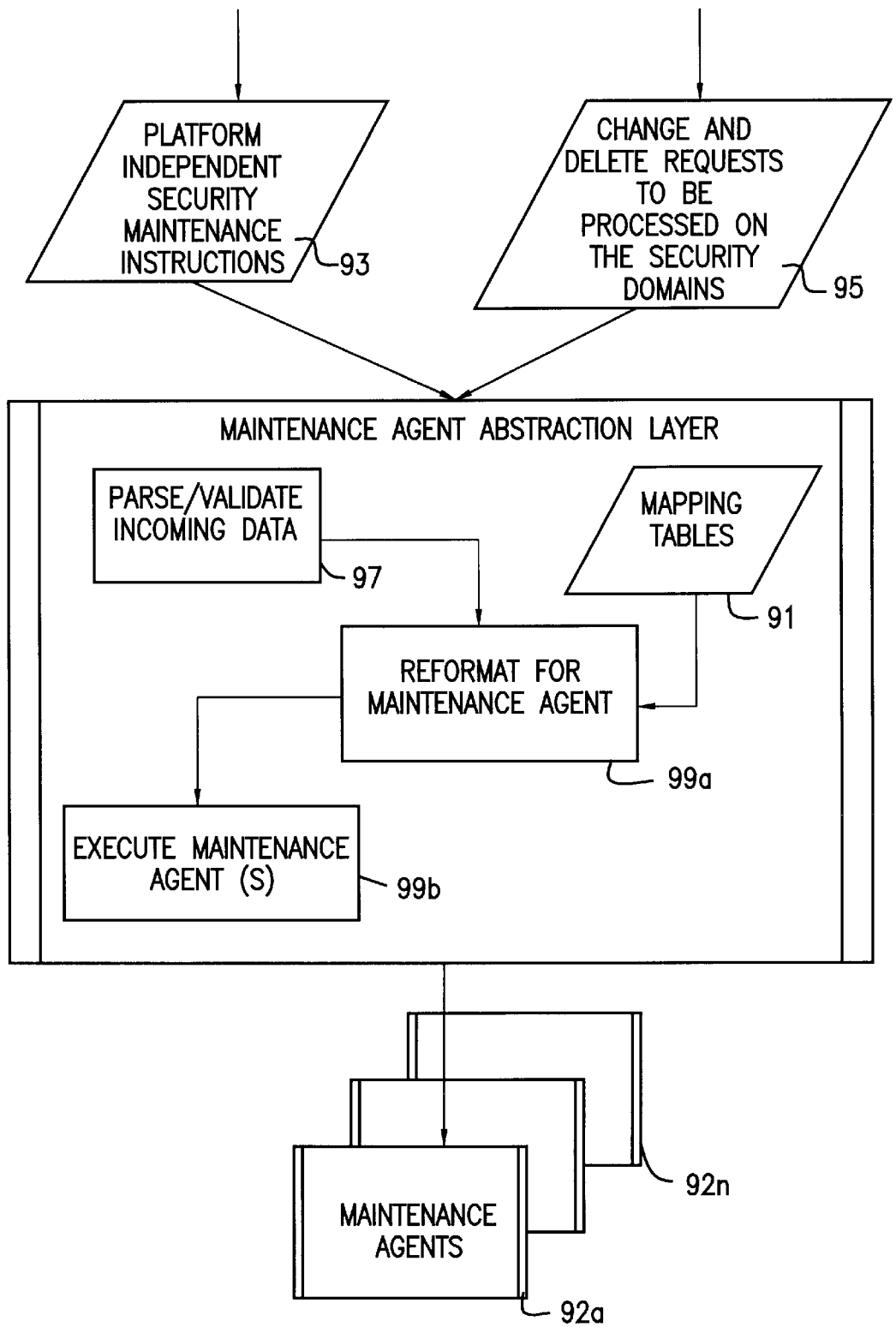

The manual maintenance agent software 86 (FIG. 3b) is a user interface software that allows maintenance to be done on any supported platform using a standard user interface, for example, a user interface that operates in accordance with the flow-chart of FIG. 9a. Such a user interface may comprise a search screen 86a, a list of accounts screen 86b, a single account detail screen 86c, an account updating screen 86d and such other screens as are necessary to provide full and effective communication by users of the system. Differences between different platforms are handled behind the scenes by the maintenance agent abstraction facility 90 (FIG. 3b) which receives instructions from the manual maintenance agent 86.

Figure 6E:
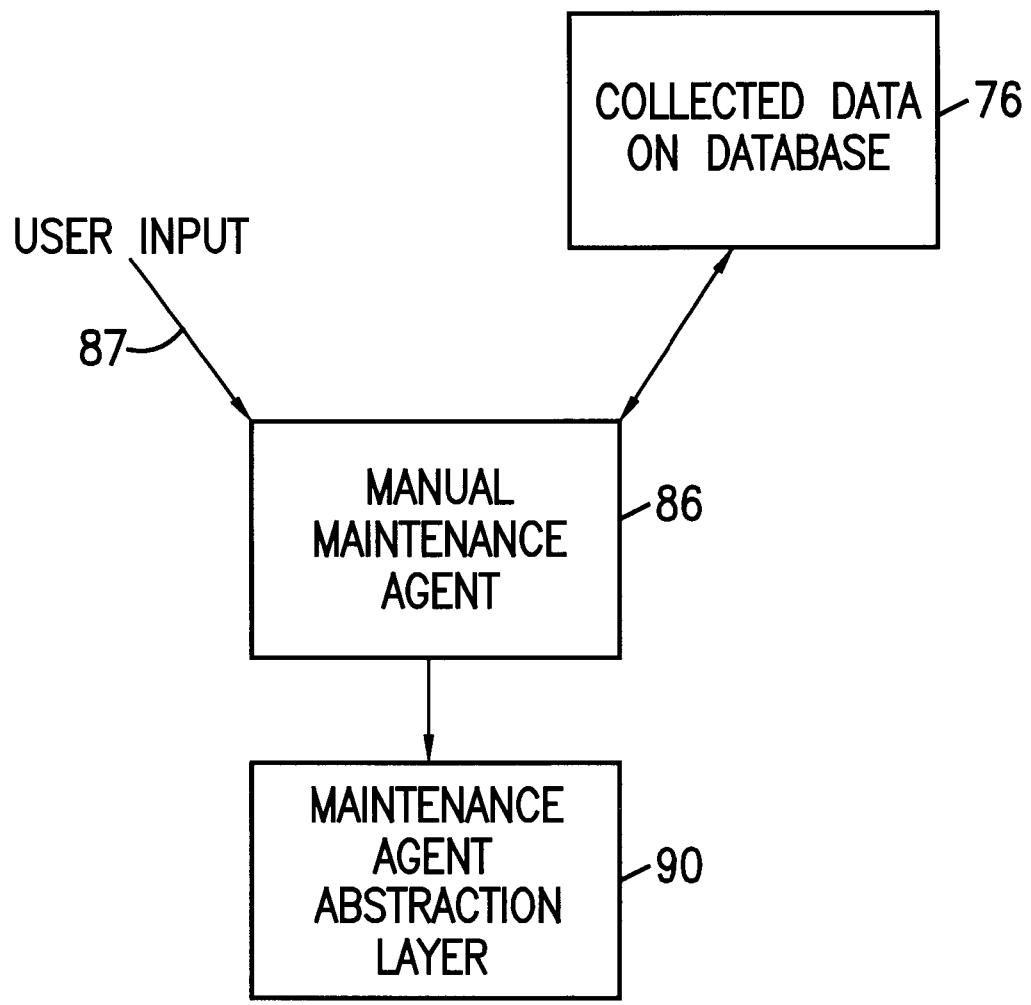

As shown in FIG. 6e, the manual maintenance agent software 86 allows the user to query collected data and make changes based on manual/user inputs 87 which are conveyed to the maintenance agent abstraction facility 90. Complex queries are supported, such as the ability to reveal all accounts for a single user. Complex changes are also supported, including the ability to propagate a single change to multiple security domains 70a–70n. This is useful, for example, when a user's name changes, or when a new user is added to several environments and services. Changes are stored in separate database tables from the collected data.

The manual maintenance agent 86 takes inputs from the user and converts them into platform independent security maintenance instructions which are then processed by the maintenance agent abstraction facility 90. Examples of platform independent security maintenance categories and data are as follows:

AddUserAccount(id, platformList, name, Payroll Number, expenseCode)

RemoveUserAccount(id, platformList)

AddUserAccountToGroup(id, platformList, GroupName)

RemoveUserAccountFromGroup(id, platformList, GroupName)

ModifyUserAccountName(id, platformList, name)

ModifyUserAccountPay(id, platformList, Pay)

ModifyUserAccountExpenseCode(id, platformList, expenseCode)

DisableUserAccount(id, platformList)

Figure 8D:
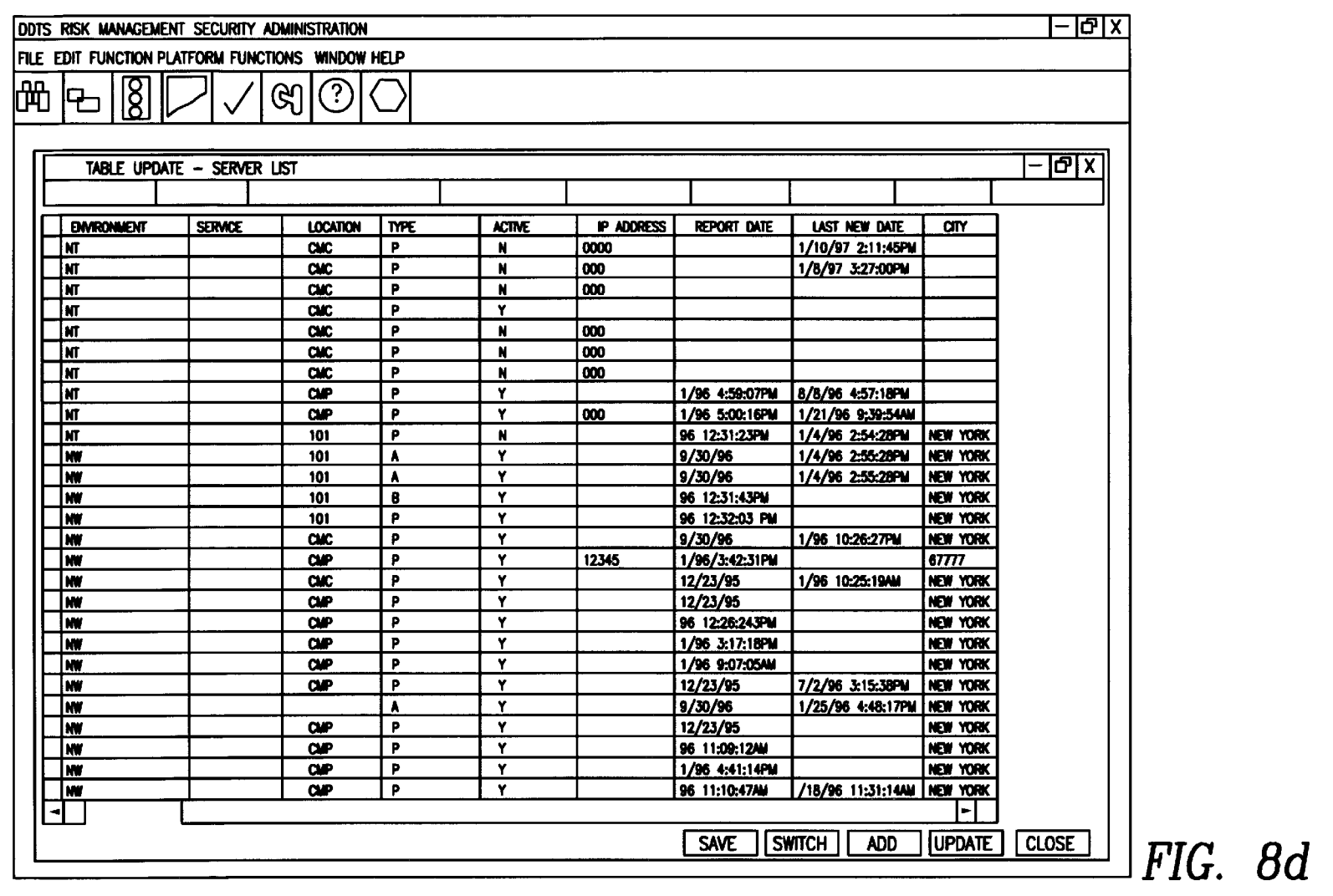
Figure 8F:
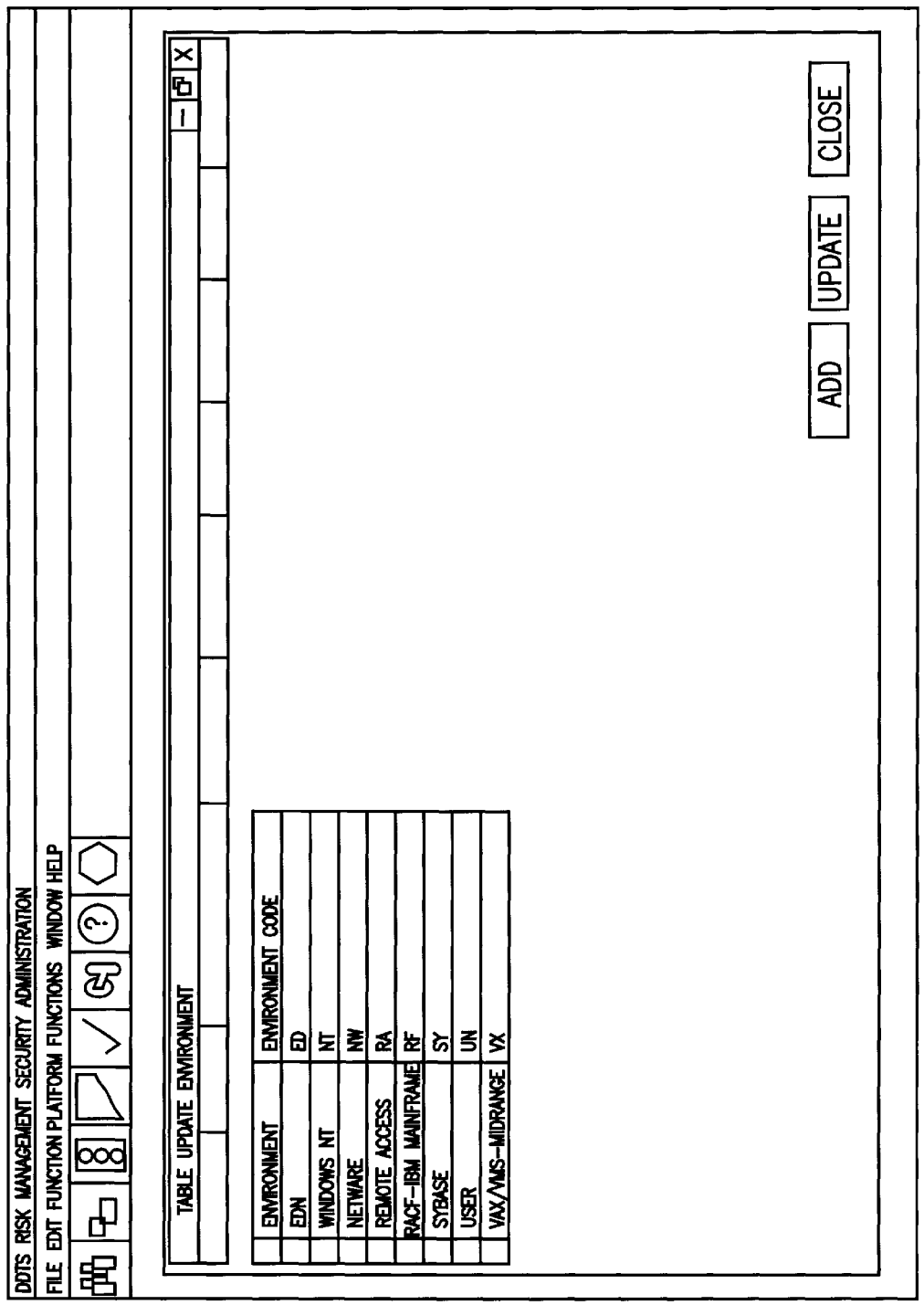

FIG. 8c shows the screen used to designate how often data should be collected. FIG. 8d shows the screen used to designate the server from which data should be collected. FIG. 8e shows the screen used to designate high risk applications. FIG. 8f shows the screen used to designate the environment. FIG. 8g shows the screen used to designate high risk reports. FIG. 8h shows the screen used to designate event code mapping of native codes to the common system code.

Figure 10:
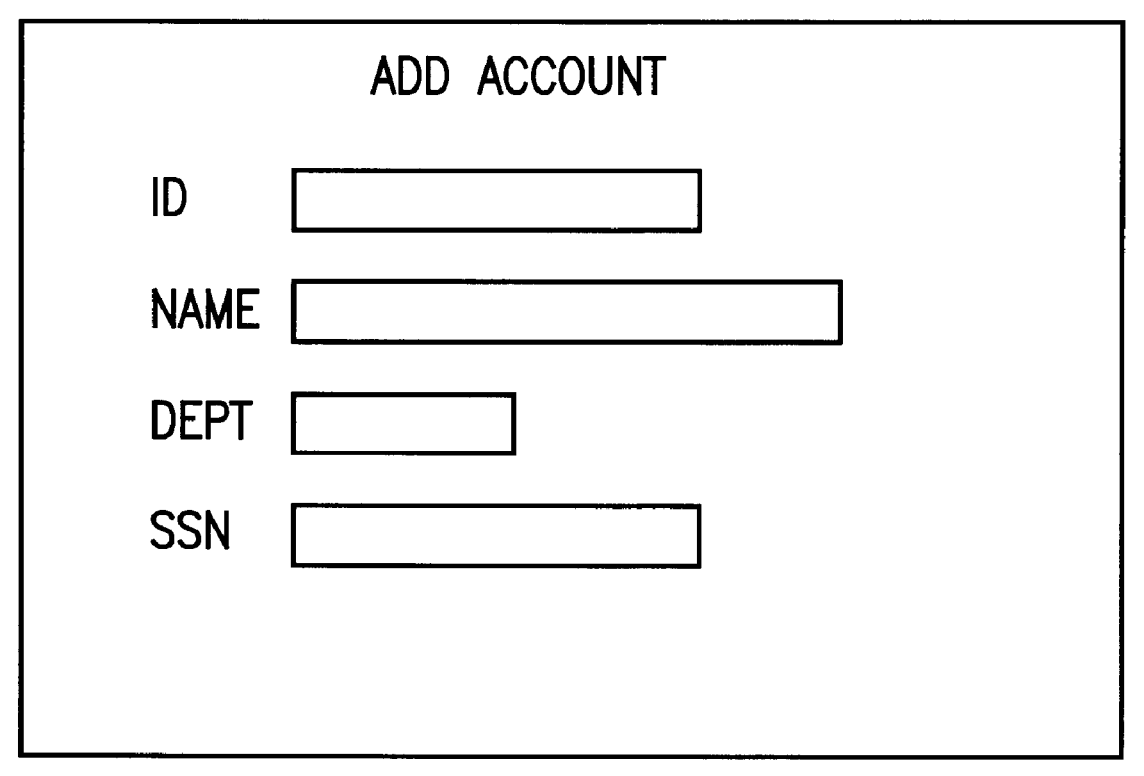

The mapping tables are generated from data entered by the user. FIG. 10 shows the input screen presented to the user. For a NetWare™ platform, the data provided by the user would be placed into two field in the following format:

ID=ID

Name=Name+/+Dept+/+Pay.

For an NT platform, the same data would be placed in different fields as:

Name=Name

Extra Info=Dept+Pay.

Although the present invention has been described in relation to particular embodiments thereof, many other variations and modifications and other uses will become apparent to those skilled in the art, such as the functional split between collection agents 72a–72n and the collection agent abstraction layer or facility 74, and between the individual maintenance agents 92a–92n and the maintenance agent abstraction layer or facility 90. It is preferred, therefore, that the present invention be limited not by the specific disclosure herein, but only by the appended claims.

What is claimed is:

1. A centralized security system for a computer network comprising a plurality of discrete computer subsystems, each subsystem having a discrete security domain associated therewith, the centralized security system comprising:
   a plurality of collection agents, each agent being operatively coupled with a respective one of said discrete security domains for collecting differently presented security-related data of said security domains;
   a collection agent abstraction facility coupled to said collection agents and effective for transforming the differently presented security-related data into a common-format security data which has a format common across said security domains;
   a database for storing said common-format security data from the collection agent abstraction facility, the database being comprised of a standardized, off-the-shelf database software program;
   a security controlling facility for examining the security data stored in the database, for ensuring that the security related data in the database indicates that the security domains are in compliance with predetermined security regulations and for issuing security related common-format commands effective for correcting computer security breach conditions; and
   a security maintenance software facility for receiving the common format commands and translating them into specific commands that are specific to and understandable by the various security domains.

2. The computer security system of claim 1, in which the security controlling facility includes a maintenance agent abstraction facility for producing the common-format commands.

3. The computer security system of claim 2, in which the security maintenance software facility includes a plurality of maintenance agents coupled to the maintenance agent abstraction facility, each maintenance agent being configured to communicate and provide the specific commands to a specific one of said security domains with which it is associated.

4. The computer security system of claim 2, in which the security controlling facility includes means for parsing and validating incoming data.

5. The computer security system of claim 2, in which the security controlling facility includes means for consulting mapping tables which convert incoming data to said common-format commands.

6. The computer security system of claim 1, in which the security controlling facility comprises a compliance facility coupled to and communicating with the database for analyzing the data in the database and for determining that individual ones of the security domains are out of compliance with the security regulations, when warranted.

7. The computer security system of claim 6, further comprising an active agent coupled to the compliance facility for formulating specific corrective actions needed to correct said computer security breach conditions.

8. The computer security system of claim 7, further comprising an alert agent coupled to the database for communicating said computer security breach conditions to personnel responsible for security.

9. The computer security system of claim 8, further including a manual maintenance agent coupled to the security controlling facility for providing manual control over the security controlling facility.

10. The computer security system of claim 9, in which the security manual maintenance agent includes means for conducting searches of user accounts.

11. The computer security system of claim 8, further comprising a query agent coupled to the security controlling facility for enabling personnel to obtain specific information concerning security conditions within the computer network.

12. The computer security system of claim 11, in which the query agent includes means for generating security group reports.

13. The computer security system of claim 11, in which the query agent includes means for generating operating system and security product reports.

14. The computer security system of claim 8, in which the alert agent comprises means for communicating with personnel via communication links selected from the group including telephones, e-mail and pagers.

15. The computer security system of claim 1, wherein the security domains are comprised of different software operating systems.

16. The computer security system of claim 1, further comprising a facility for generating exception reports describing deviations from the security regulations.

17. The computer security system of claim 1, in which the database comprises security-policy data.

18. The computer security system of claim 1, in which the database comprises threshold parameters which define situations triggering alarm conditions.

19. The computer security system of claim 1, in which each one of the security domains associated with an entire network of an organization is connected to a respective one of said collection agents.

20. A method of centrally controlling security in a computer network comprising a plurality of discrete computer subsystems each having a discrete security domain associated therewith, the method comprising the steps of:
   separately collecting from each of the security domains security-related data associated with each security domain, wherein each security-related data is uniquely presented;
   supplying the security-related data collected from the security domains to a collection agent abstraction facility and deploying the collection agent abstraction facility to transform the separately collected security-related data into a common-format security data, said transformation of the separately collected security-related data including the steps of:
      mapping the data collected from a single security domain to a generic language using a predetermined map for the environment; and
      sending the mapped data to a database;
   storing the common-format security data in the database;
   analyzing the common-format security-related data for discerning in the data out-of-compliance conditions in specific ones of said security domains by comparing the data with predetermined security regulations;
   issuing common-format security-related commands effective for controlling security at the individual security domains;
   converting the common-format security-related commands to a plurality of specific security commands which are configured to be understood by corresponding ones of said security domains; and repeating the above-steps for remaining ones of said security domains.

21. The method of claim 20, including converting the common-format security-related commands to at least one specific command which results in iterative execution of a single maintenance agent function.

22. The method of claim 20, in which the out-of-compliance conditions include one or more of the following conditions:
   a) an unusually large increase in the number of failed access attempts;
   b) repeated failed attempts from a single user or location;
   c) attempted modification of predetermined key security regulations;
   d) minimum password length is less than a predetermined number of characters;
   e) password life is longer than 90 days;
   f) more than three failed logins not being disallowed before an account is disabled;
   g) concurrent logins are allowed;
   h) account has not been used in 90 days and has not been disabled; and
   i) account was used after employee termination date.

23. The method of claim 20, including storing in the database threshold parameters for triggering alarm conditions which require the alerting of security personnel.

24. The method of claim 20, including controlling how often security-related data is collected from each of the security domains.

25. The method of claim 20, including providing an operator controlled field which can be used to designate from which one of said security domains security-related data is to be collected.

26. The method of claim 20, in which the step of separately collecting the security-related data from the security domains comprises providing a plurality of collection agents, each agent being operatively coupled with a respective one of said discrete security domains for collecting differently presented security-related data of said security domains.

27. The method of claim 20, in which the step of converting the common-format security-related commands to specific security commands comprises using a plurality of maintenance agents coupled to a maintenance agent abstraction facility, wherein each maintenance agent is configured to communicate and provide the specific security commands to a specific one of said security domains with which it is associated.

28. A method of centrally controlling security in a computer network comprising a plurality of discrete computer subsystems each having a discrete security domain associated therewith, the method comprising the steps of:

separately collecting from each of the security domains security-related data associated with each security domain, wherein each security-related data is uniquely presented;

supplying the security-related data collected from the security domains to a collection agent abstraction facility and deploying the collection agent abstraction facility to transform the separately collected security-related data into a common-format security data;

storing the common-format security data in a database;

analyzing the common-format security-related data for discerning in the data out-of-compliance conditions in specific ones of said security domains by comparing the data with predetermined security regulations;

issuing common-format security-related commands effective for controlling security at the individual security domains; and converting the common-format security-related commands to a plurality of specific security commands which are configured to be understood by corresponding ones of said security domains, the plurality of specific security commands including a specific command which results in the execution of multiple maintenance agent actions.

29. The method of claim 28, in which the out-of-compliance conditions include one or more of the following conditions:
   a) an unusually large increase in the number of failed access attempts;
   b) repeated failed attempts from a single user or location;
   c) attempted modification of predetermined key security regulations;
   d) minimum password length is less than a predetermined number of characters;
   e) password life is longer than 90 days;
   f) more than three failed logins not being disallowed before an account is disabled;
   g) concurrent logins are allowed;
   h) account has not been used in 90 days and has not been disabled; and
   i) account was used after employee termination date.

30. The method of claim 28, including storing in the database threshold parameters for triggering alarm conditions which require the alerting of security personnel.

31. The method of claim 28, including controlling how often security-related data is collected from each of the security domains.

32. The method of claim 28, including providing an operator controlled field which can be used to designate from which one of said security domains security-related data is to be collected.

33. The method of claim 28, in which the step of separately collecting the security-related data from the security domains comprises providing a plurality of collection agents, each agent being operatively coupled with a respective one of said discrete security domains for collecting differently presented security-related data of said security domains.

34. The method of claim 28, in which the step of converting the common-format security-related commands to specific security commands comprises using a plurality of maintenance agents coupled to a maintenance agent abstraction facility, wherein each maintenance agent is configured to communicate and provide the specific security commands to a specific one of said security domains with which it is associated.

\* \* \* \* \*